United States Patent
Zhu et al.

(10) Patent No.: US 11,301,794 B2
(45) Date of Patent: *Apr. 12, 2022

(54) MACHINE FOR LABOR OPTIMIZATION FOR EFFICIENT SHIPPING

(71) Applicant: INTERNATIONAL BUSINESS MACHINES CORPORATION, Armonk, NY (US)

(72) Inventors: Yada Zhu, Westchester, NY (US); Xuan Liu, Yorktown Heights, NY (US); Brian Leo Quanz, Yorktown Heights, NY (US); Ajay Ashok Deshpande, White Plains, NY (US); Ali Koc, White Plains, NY (US); Lei Cao, Worcester, MA (US); Yingjie Li, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

This patent is subject to a terminal disclaimer.

(21) Appl. No.: 16/005,373

(22) Filed: Jun. 11, 2018

(65) Prior Publication Data
US 2019/0378066 A1    Dec. 12, 2019

(51) Int. Cl.
*G06Q 10/06* (2012.01)
*G06Q 10/08* (2012.01)
(Continued)

(52) U.S. Cl.
CPC .......... *G06Q 10/0633* (2013.01); *G06N 7/08* (2013.01); *G06N 20/00* (2019.01);
(Continued)

(58) Field of Classification Search
None
See application file for complete search history.

(56) References Cited

U.S. PATENT DOCUMENTS 6,721,762 B1    4/2004    Levine et al.
7,440,908 B2    10/2008    Snapp et al.
(Continued)

FOREIGN PATENT DOCUMENTS

WO    2003/075195 A2    9/2003
WO    2011/085500 A1    7/2011
(Continued)

OTHER PUBLICATIONS

Sheikholeslami et al. "Progressive Latin Hypercube Sampling: An Efficient Approach for Robust Sampling-Based Analysis of Environmental Needs." Environmental Modelling and Software, 93, 109-126, Jul. 2017.*
(Continued)

*Primary Examiner* — Susanna M. Diaz
(74) *Attorney, Agent, or Firm* — Intelletek Law Group, PLLC; Gabriel Daniel, Esq.

(57) ABSTRACT

A computer implemented method and system of calculating labor resources for a network of nodes in an omnichannel distribution system. Input parameters are received from a computing device of a user. Historical data related to a network of nodes is received, from a data repository. A synthetic scenario is determined based on the received input parameters and the historical data. For each node, key parameters are identified and set based on a multi-objective optimization, wherein the multi-objective optimization includes a synthetic inventory allocation to the node based on the synthetic scenario. A synthetic labor efficiency is determined for the node from the synthetic scenario. Labor resources are calculated based on the synthetic inventory allocation for the synthetic scenario. The labor resources of at least one node are displayed on a user interface of a user device.

18 Claims, 14 Drawing Sheets

(51) Int. Cl.
  *G06N 7/08* (2006.01)
  *G06Q 30/02* (2012.01)
  *G06N 20/00* (2019.01)
(52) U.S. Cl.
  CPC ..... *G06Q 10/06393* (2013.01); *G06Q 10/087* (2013.01); *G06Q 10/0838* (2013.01); *G06Q 30/0201* (2013.01)

(56) References Cited

U.S. PATENT DOCUMENTS

| | | | |
|---|---|---|---|
| 8,682,751 B1 | 3/2014 | Anthony | |
| 8,972,564 B1 | 3/2015 | Allen | |
| 9,142,035 B1 | 9/2015 | Rotman et al. | |
| 9,213,953 B1 | 12/2015 | Kassmann et al. | |
| 9,230,233 B1 | 1/2016 | Sundaresan et al. | |
| 9,336,302 B1 | 5/2016 | Swamy | |
| 9,501,613 B1* | 11/2016 | Hanson | G16H 40/67 |
| 2003/0061125 A1* | 3/2003 | Hoffman | G06Q 10/087 705/28 |
| 2007/0087756 A1 | 4/2007 | Hoffberg | |
| 2008/0028409 A1 | 1/2008 | Cherkasova | |
| 2008/0288312 A1* | 11/2008 | Miles | G06Q 30/02 705/7.34 |
| 2008/0306785 A1 | 12/2008 | Schuler et al. | |
| 2009/0006164 A1 | 1/2009 | Kaiser et al. | |
| 2009/0089150 A1 | 4/2009 | Lee et al. | |
| 2009/0099935 A1 | 4/2009 | Hamzy et al. | |
| 2010/0317420 A1 | 12/2010 | Hoffberg | |
| 2011/0054869 A1 | 3/2011 | Li | |
| 2011/0307438 A1* | 12/2011 | Fernández Martínez | G06N 7/005 706/52 |
| 2012/0072423 A1* | 3/2012 | Morrison | G06F 11/3466 707/739 |
| 2012/0078675 A1 | 3/2012 | McNeill et al. | |
| 2012/0317059 A1* | 12/2012 | Joshi | G06Q 10/06 706/12 |
| 2013/0060712 A1 | 3/2013 | Esmili et al. | |
| 2013/0144763 A1 | 6/2013 | Skyberg et al. | |
| 2013/0232028 A1 | 9/2013 | Spremulli | |
| 2013/0246986 A1* | 9/2013 | Kuo | G06F 30/367 716/106 |
| 2014/0052677 A1* | 2/2014 | Wagner | G06N 5/003 706/13 |
| 2014/0172735 A1 | 6/2014 | Jena et al. | |
| 2014/0172736 A1 | 6/2014 | Saha | |
| 2015/0120368 A1* | 4/2015 | Agrawal | G06Q 10/06315 705/7.25 |
| 2015/0186819 A1 | 7/2015 | Patel | |
| 2015/0363843 A1 | 12/2015 | Loppatto et al. | |
| 2015/0379430 A1* | 12/2015 | Dirac | G06N 20/00 706/12 |
| 2016/0055452 A1 | 2/2016 | Qin | |
| 2016/0063419 A1* | 3/2016 | Martinez | G06Q 10/06315 705/7.25 |
| 2016/0110681 A1 | 4/2016 | Brereton | |
| 2016/0110735 A1 | 4/2016 | Brereton et al. | |
| 2016/0140589 A1 | 5/2016 | Deshpande et al. | |
| 2016/0328674 A1* | 11/2016 | Tripathi | G06Q 30/0635 |
| 2016/0328781 A1* | 11/2016 | Patel-Zellinger | G06Q 30/0635 |
| 2017/0032016 A1* | 2/2017 | Zinner | G06Q 10/063 |
| 2017/0161614 A1 | 6/2017 | Mehta | |
| 2017/0323250 A1* | 11/2017 | Lindbo | G06Q 30/0621 |
| 2018/0075401 A1 | 3/2018 | Harsha et al. | |
| 2018/0137415 A1 | 5/2018 | Steinberg et al. | |

FOREIGN PATENT DOCUMENTS

| | | | |
|---|---|---|---|
| WO | 2016/039724 A1 | 3/2016 | |
| WO | WO-2017217957 A1 * | 12/2017 | G06F 30/20 |

OTHER PUBLICATIONS

Rumsey, Deborah J. "How Sample Size Affects Standard Error." From the book "Statistics for Dummies, 2nd Edition." Last Updated on Mar. 26, 2016. Retrieved from {URL: https://www.dummies.com/article/academics-the-arts/math/statistics/how-sample-size-affects-standard-error-169850}. (Year: 2016).*
List of IBM Patents or Applications Treated as Related.
Labor Optimization in the New "Everywhere Commerce" Retail World; Manhattan Associates, (2013); 5 pgs.
Mell P. et al., "The NIST Definition of Cloud Computing"; National Institute of Standards and Technology, Gaithersburg, MD USA (2011) 7 pgs.
Khare, T., "Optimzation of Warehouse Cost & Workforce Forecasting"; NEC (2015); 8 pgs.
Schulte, M. J. et al. "A Variable-Precision Interval Arithmetic Processor"; Proceedings of IEEE International Conference on Application Specific Array Processors (ASSAP'94); pp. 248-258 (Year:1994).

* cited by examiner

MACHINE FOR LABOR OPTIMIZATION FOR EFFICIENT SHIPPING

BACKGROUND

Technical Field

The present disclosure generally relates to simulators, and more particularly, to modeling behavior of a networked system.

Description of the Related Art

Today, retailers use a larger number and different types of nodes to distribute and position their inventory, by way of allocation planning. In some scenarios, an omnichannel supply chain model is used for a central stock pool to control various factors, such as fulfillment, pricing, sales, ordering, and stock management. Omnichannel retailing provides a seamless customer experience across all possible touch points and locations for a product, including brick stores, catalogs, online, mobile, and social. To maintain such experience at a low cost to the retailer, optimization based fulfillment strategies have emerged in the market. Such strategies model fulfillment into a multi-dimensional optimization problem by taking into account various factors that contribute to the fulfillment costs. These fulfillment strategies offer retailers an opportunity to reduce the fulfillment cost. One of the major costs of fulfillment is labor cost.

SUMMARY

According to various exemplary embodiments, a computing device, a non-transitory computer readable storage medium, and a computer implemented method of calculating labor resources for a network of nodes in an omnichannel distribution system are provided. Historical data related to a network of nodes of the omnichannel distribution system is received from a data repository. A synthetic scenario is determined based on the received input parameters and the historical data. For each node, key parameters are identified and set based on a multi-objective optimization, wherein the multi-objective optimization includes a synthetic inventory allocation to the node based on the synthetic scenario. A synthetic labor efficiency is determined for the node from the synthetic scenario. Labor resources are calculated based on the synthetic inventory allocation for the synthetic scenario. The labor resources of at least one node are displayed on a user interface of a user device.

In one embodiment, setting the key parameters based on the multi-objective optimization includes, for each node, determining a range of each key parameter based on the synthetic scenario. Further, a number of simulations N to perform is determined, with data sampled from the synthetic scenario within the determined range of each key parameter. For each of the N simulations, a multi-objective optimization is performed to determine a cost factor of the parameter settings. The cost factor is stored in the storage device. The parameter settings with a lowest cost factor are then selected.

In one embodiment, determining the synthetic scenario includes creating a synthetic demand status data based on the historical data and the input parameters. A synthetic network status data is created based on the historical data, the input parameters, and the synthetic demand status.

In one embodiment, the historical data includes raw demand data of one or more products offered by the network of nodes, raw node data of each node in the network of nodes, and raw labor efficiency data of each node in the network of nodes. The synthetic demand status is based on the raw demand data, and the synthetic network status is based on the raw node data.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
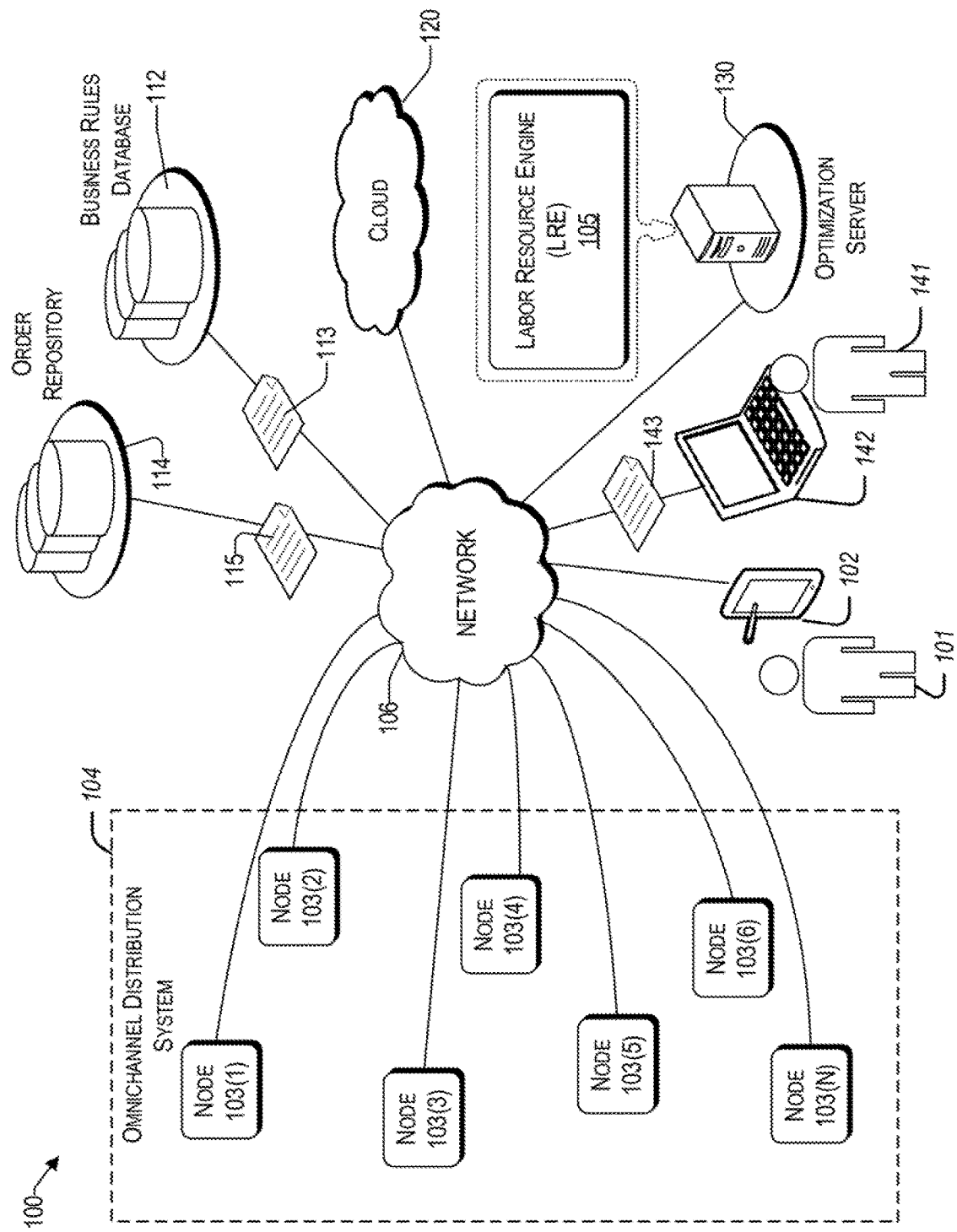
FIG. 1 illustrates an example architecture that may be used to implement a system for allocating labor resources for a system of nodes having multi-objective optimization.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure relates to modeling and optimizing the behavior of a networked system having a plurality of nodes, based on predetermined criteria. As used herein, a node is a retail store, warehouse, fulfillment center, clearance center, and the like. In view of the increasing competition from online retailers, and for enabling an omnichannel customer experience, retailers have begun using different options, such as ship from store, same day delivery, ship from various locations, and/or buy online and pickup in store. Such flexible approach involves many variables for a computing system to accommodate. To create an omnichannel experience, retailers strive to meet different competing business objectives such as minimizing shipping costs, avoiding markdowns, maximizing customer satisfaction, and reducing workloads at the nodes of the retail enterprise.

Today, an omnichannel distribution system offers a plethora of products that are to be distributed via different nodes and locations. Predictions of life-cycle demand are typically noisy in that it they are prone to relatively high error. Simply allocating inventory and/or labor resources to mean demand predictions can inordinately increase e-commerce fulfillment cost and lost store sales over the selling season of a product. There are incremental costs incurred due to over-allocating at a location (e.g., excess inventory occupies space, prices are marked down, fulfilling long-distance e-commerce orders can be expensive, labor costs increase with increased shipments, etc.,). Similarly, over-allocating labor resources increases the overall fulfillment cost. Under-allocating inventory at specific nodes may lead to lost sales opportunities or increased fulfillment cost. Similarly, under-allocating labor resources at specific nodes may create a bottleneck for fulfillment, ultimately raising the fulfillment cost for a shipment.

To meet rapidly growing e-commerce demand and expectations, retailers are increasingly shifting to an omni-channel fulfillment approach—i.e., using all nodes in their fulfillment network, including brick-and-mortar stores, to fulfill online orders. This leads to new challenges as fulfillment networks now have potentially thousands of different, diverse nodes, and multiple, conflicting business objectives to consider when deciding how to fulfill an order, such as minimizing shipping cost, balancing load across the network, avoiding markdowns, and optimizing the labor force at each node. The known solutions are typically not scalable, flexible, or capable enough to meet retailers' needs, and often end up in sub-optimal solutions only partially addressing a subset of the business objectives.

Accordingly, as retail chains become more agile to meet increasing consumer demands, the labor resources should evolve to support the predicted electronic commerce patterns. As used herein, labor resources include regular, overtime, and temporary labor. Applicants have identified that simply allocating labor resources for a node based on prior demand does not optimize the distribution workforce such that overall fulfillment for the system of nodes is reduced, thereby leaving the system as a whole at a disadvantage in terms of costs, service levels, and competitiveness. Allocating too much labor resources at one node instead of another node increase overall fulfillment cost. Too little labor resources at a node and service levels are sacrificed and sales are lost. Neither scenario is acceptable in today's highly competitive marketplace.

The teachings herein provide a computerized system that is configured to evaluate and compare the performance of different fulfillment strategies by adjustment of parameters in a virtual simulated environment. In this regard, input parameters are received from a computing device of a user. Historical data related to a network of nodes is received, from a data repository. A synthetic scenario is determined based on the received input parameters and the historical data. For each node, key parameters are identified and set based on a multi-objective optimization, wherein the multi-objective optimization includes a synthetic inventory allocation to the node based on the synthetic scenario. A synthetic labor efficiency is determined for the node from the synthetic scenario. Labor resources are calculated based on the synthetic inventory allocation for the synthetic scenario. Accordingly, the fulfillment strategies for the network of nodes are optimized while balancing multiple conflicting objectives, such as minimizing shipping cost, balancing network load, and avoiding markdowns and stock-outs, and minimizing labor cost.

By virtue of the teachings herein, the computerized system can create various prospective fulfillment models that can accurately forecast different scenarios and optimize the settings of the parameters for the nodes, including the labor resources thereof, based on a synthetic scenario. The architecture improves computational efficiency by reducing the samples in the memory of the one or more computing devices to data points that are deemed to be statistically relevant for the calculations to be performed. Reference now is made in detail to the examples illustrated in the accompanying drawings and discussed below.

FIG. 1 illustrates an example architecture 100 that may be used to implement a system for allocating labor resources for a system of nodes having multi-objective optimization. Architecture 100 includes an omnichannel distribution system 104 having a network of nodes 103(1) to 103(N) that may be used to distribute various products. The nodes of the omnichannel distribution system 104 may include various brick and mortar stores that may be at different locations, referred to herein as zones. For example, node 103(1) may be in New York, while node 102(2) may be in Los Angeles. In various embodiments, the zones may be based at different levels of granularity and may overlap, such as countries, regions, states, zip codes, or a particular address.

The omnichannel distribution system 104 may include one or more warehouses, where products may be received from various manufacturers. For example, node 103(2) may be a warehouse that is used as a preliminary repository for a product that can then be distributed to secondary nodes, such as brick and mortar stores 103(1) and 103(2), or e-commerce warehouses 103(4), sometimes referred to as e-fulfillment centers. Such e-fulfillment centers (EFCs) may be distributed in various zones to accommodate online (or catalogue) orders from users via their computing device, represented herein by customer 101 and their computing device 102.

In the omnichannel distribution system 104, a brick and mortar store, such as store 103(1), can accommodate both walk-in customers and e-commerce customers, who may be far away from the store 103(1) using a retailer initiated ship-from-store fulfillment. Accordingly, store inventory can be used to satisfy both store demand and online demand. On the other hand, warehouses and/or e-fulfillment centers have no-walk in customers and cater predominantly to online demand.

To reduce fulfillment cost and provide better customer service, an e-fulfillment center is ideally located within a convenient shipping distance from the purchase destination of a product that has been ordered online by way of a computing 102 of a customer 101. In this way, orders that have a short deadline may be able to be fulfilled more cost effectively. The omnichannel distribution system 104 shares inventory for a product to maximize revenue and reduce order fulfillment cost.

Each node (103(1) to 103(N)) in the omnichannel distribution system 104 generates raw data, that may include sales and lost sales data, such as the order number, order line number stock keeping unit (SKU) number, expected markdowns, and/or other data. This raw demand and node data may be provided to an appropriate recipient, such as an order repository 114 or the optimization server 130, over the network 106. The raw data may be received from the nodes 103(1) to 103(N) at predetermined intervals (e.g., daily, weekly, monthly, etc.,), upon a trigger event (e.g., a threshold number of the product were sold), or upon request from the optimization server 116.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with an order repository 114. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users.

The order repository 114 is configured to store historical data related to orders and fulfillment by way of the omnichannel distribution system 104 (sometimes referred to herein as a network of nodes) for different time periods. Accordingly, historical data may include raw data regarding orders, which may be received from user devices (e.g., 102) at a time of order. Historical data may also include node network status data, which may be received from the network of nodes 103(1) to 103(N). The historical data 115 of the order repository 114 can be provided to the optimization server 130 at predetermined intervals or upon a trigger event (e.g., request from the optimization server 130).

The architecture 100 may include a business rules database 112 that has stored therein service level agreements (SLAs) that define commitments that prevail between a service provider associated with the network of nodes 103 (1) to 103(N) and an account of the customer 101. The business rules database 112 can provide the SLA 113 such that it is coupled with each order of a customer 101. The SLA 113 may also be used by the optimization server 130 to interpret an SLA code provided in the context of an order. The business rules database 112 may also be a source of key parameters of different nodes. Key parameters may include, without limitation, a maximum dollar amount for shipping per order, a penalty cost of over-capacity, a capacity threshold at which a penalty is added for exceeding an identified risk, etc.

The architecture 100 includes a labor resource engine (LRE) 105, which is a program that runs on the optimization server 130. The LRE 105 is configured to receive historical data 115 from the order repository 114, input parameters from an administrator (sometimes referred to herein as a user) 141 via their computing device 142, and business rules 113 from the business rules database 112. In various embodiments, input parameters may be received in a single data packet or in several data packets by way of interactive communication between the LRE 105 and the computing device 142.

Based on the historical data 115 and the input parameters 143, the LRE 105 is configured to identify (i) a synthetic demand and (ii) a synthetic node network status, which together provide a synthetic scenario, discussed in more detail later. This synthetic scenario can be used to determine a prospective cost, sometimes referred to herein as a cost factor, based on different settings of the parameters of a node. A synthetic scenario can also be used to determine a synthetic labor efficiency for each node. In this way, different global parameters for nodes can be evaluated and the cost factors provided on a user interface of the computing device 142 of the user 141.

In one embodiment, machine learning is used by the LRE 105 to learn from the historical data 115 to develop the synthetic scenario. Machine learning is used herein to construct algorithms that can learn from and make predictions based on the historical data 115 stored in the order repository 114. Such algorithms operate by building a model from stored prior inputs or baselines therefrom to make data-driven predictions or decisions (or to provide threshold conditions to indicate a demand data and/or network status data), rather than following strictly static criteria.

Based on the machine learning, patterns, trends, and signatures of the demand status and network status are identified and combined with the user input parameters to create a synthetic scenario. In various embodiments, the machine learning discussed herein may be supervised or unsupervised. In supervised learning, the LRE 105 may be presented with example historical data 115 from the order repository 114 as being representative of different conditions of the omnichannel distribution system 104 and/or the orders. Put differently, the historical data 115 acts as a teacher for the LRE 105. In unsupervised learning, the order repository 114 does not provide any labels as what is acceptable; rather, it simply provides raw historical data 115 to the LRE 105 that can be used together with the input parameters from the computing device 142 to find its own structure among the data. In various embodiments, the machine learning may make use of techniques such as supervised learning, unsupervised learning, semi-supervised learning, naïve Bayes, Bayesian networks, decision trees, neural networks, fuzzy logic models, and/or probabilistic classification models.

Each parameter may have a range. Accordingly, the combination of values for the different relevant parameters for a node may be a large number. To reduce the computational load, the LRE 105 is configured to determine a number of simulations (N) to perform. The number N may be based on computational resources and/or the accuracy desired. For example, the number N may be limited to a predetermined time limit to come to a conclusion based on the computational resources available to the optimization server 130. Accordingly, the LRE 105 determines how long a simulation would take P. The LRE 105 then divides the allocated time (i.e., time limit) by P. In this way, the computing resources and energy cost of preforming the N simulations is limited.

For purposes of discussion, different computing devices (e.g., 102 and 142) appear in the drawing, to represent some examples of the devices that may be used to place orders, provide input parameters, receive various notifications from the LRE 105, etc. Today, computing devices typically take the form of tablet computers, laptops, desktops, personal digital assistants (PDAs), portable handsets, smart-phones, and smart watches, although they may be implemented in other form factors, including consumer, and business electronic devices.

While the order repository 114, business rules database 112, and optimization server 130 are illustrated by way of example to be on different platforms, in various embodiments, these platforms may be combined in various combinations. In other embodiments, one or more of these computing platforms may be implemented by virtual computing devices in the form of virtual machines or software containers that are hosted in the cloud 120, thereby providing an elastic architecture for processing and storage, discussed in more detail later. Thus, the functionality described herein with respect to each of the order repository 114, business rules database 112, and optimization server 130 can also be provided by one or multiple different computing devices.

Figure 2:
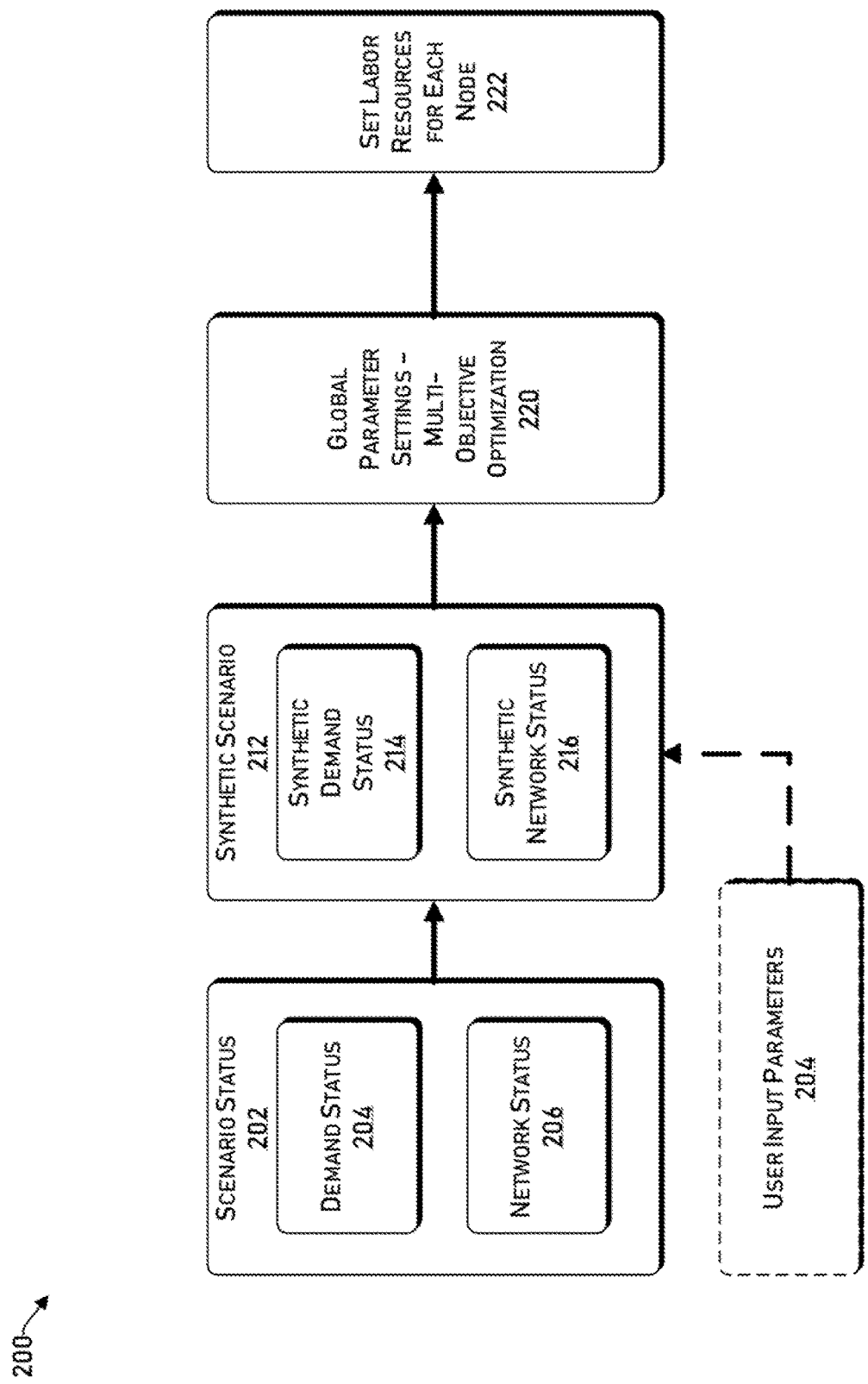
FIG. 2 is a block diagram of a system for setting node parameters and labor resources for nodes of an omnichannel network of nodes, consistent with an illustrative embodiment.

FIG. 2 is a block diagram of a system 200 for setting node parameters and labor resources for nodes of an omnichannel network of nodes, consistent with an illustrative embodiment. For discussion purposes, the block diagram of FIG. 2 is described with reference to the architecture 100 of FIG. 1.

The scenario status 202 comprises the demand status 204 and the network status 206. The demand status 204 represents raw data related to the orders of one or more products offered by the network of nodes of the omnichannel distribution system 104. Such data may include the order number, order line number, SKU number, order creation time, order process time, source location (e.g., ZIP), fulfillment time requirement (e.g., 2 days, 5, days, 10 days, etc.), destination location (e.g., ZIP), fulfillment node, unit number, carrier mode, shipping cost, service level agreement (SLA) identification code or name, and the like. This raw order data is for a predetermined period (e.g., time, day, week, month, year, etc.,) and is received by the order repository 114 for storage as demand status information 204.

The network status 206 represents raw data related to the condition of the network of nodes for the same predetermined period. This raw data of the node network includes a number of lines per package, weight of package, type of shipment, cost of shipment, number of shipments per order, buy quantity, prepack data, basket purchase information, proximity to a transportation hub, labor resources (including cost), labor efficiency (e.g., typical labor time to fulfil an order), and the like. This raw data of the node network, sometimes referred to herein as the omnichannel distribution system 104, is also received by the order repository 114 for storage as network status information 206. In various embodiments, the demand status can be determined before, after, or concurrently with the network status.

The raw information provided by the scenario status 202 is retrospective and therefore may or may not provide the scenario envisioned by a user (e.g., by way of the user input parameters 204), which may describe a scenario that is prospective (or different in other ways). For example, a user may be interested in different fulfillment strategies of a prospective scenario, such as a future super-bowl, a seasonal event, hypothetical natural phenomenon (e.g., heavy snow storm at a major distribution center). To that end, the demand status information 204 and the network status information 206 are used as a corpus of data to learn from by way of machine learning and combined with the user input parameters to develop a synthetic scenario 212 that includes a synthetic demand status 214 and a synthetic network status 216. More particularly, the raw data of the demand status information 204 is retrieved from the order repository 114 to create a synthetic demand status information 214 based on the user input parameters 204. Similarly, the raw data of the node network status information 206 is used to create the synthetic network status information 216 based on the user input parameters. In this way, a synthetic scenario 212 is created that accommodates the scenario envisioned by the user. The synthetic scenario can then be used by the LRE 105 to calculate the appropriate resources for each node of the omnichannel network of nodes, by way of a number (N) of experiments (i.e., simulations) that explore different permutations of settings for the combination of parameters for each corresponding cluster.

The key performance indicators (KPIs) extracted from the synthetic scenario 212 that are related to demand for a predetermined period may include one or more of the following: a number of orders, average line per order, average units per order, average shipping zone per order, average weight per order, percentage of different product categories, percentage of different number of order-line orders, percentage of orders from different regions, shipping deadlines (e.g., same day shipment, 2 days, 5, days, etc.), and the like. The KPIs extracted from the synthetic scenario 212 that are related to the network status may include one or more of the following: packages per order, cost per order, cost per package, end of day (EOD) backlog days, average cost per order-line, average package per order-line, number/percentage of upgraded orders, number/percentage of delayed orders, labor cost (e.g., per hour), labor efficiency, etc.

Figure 3:
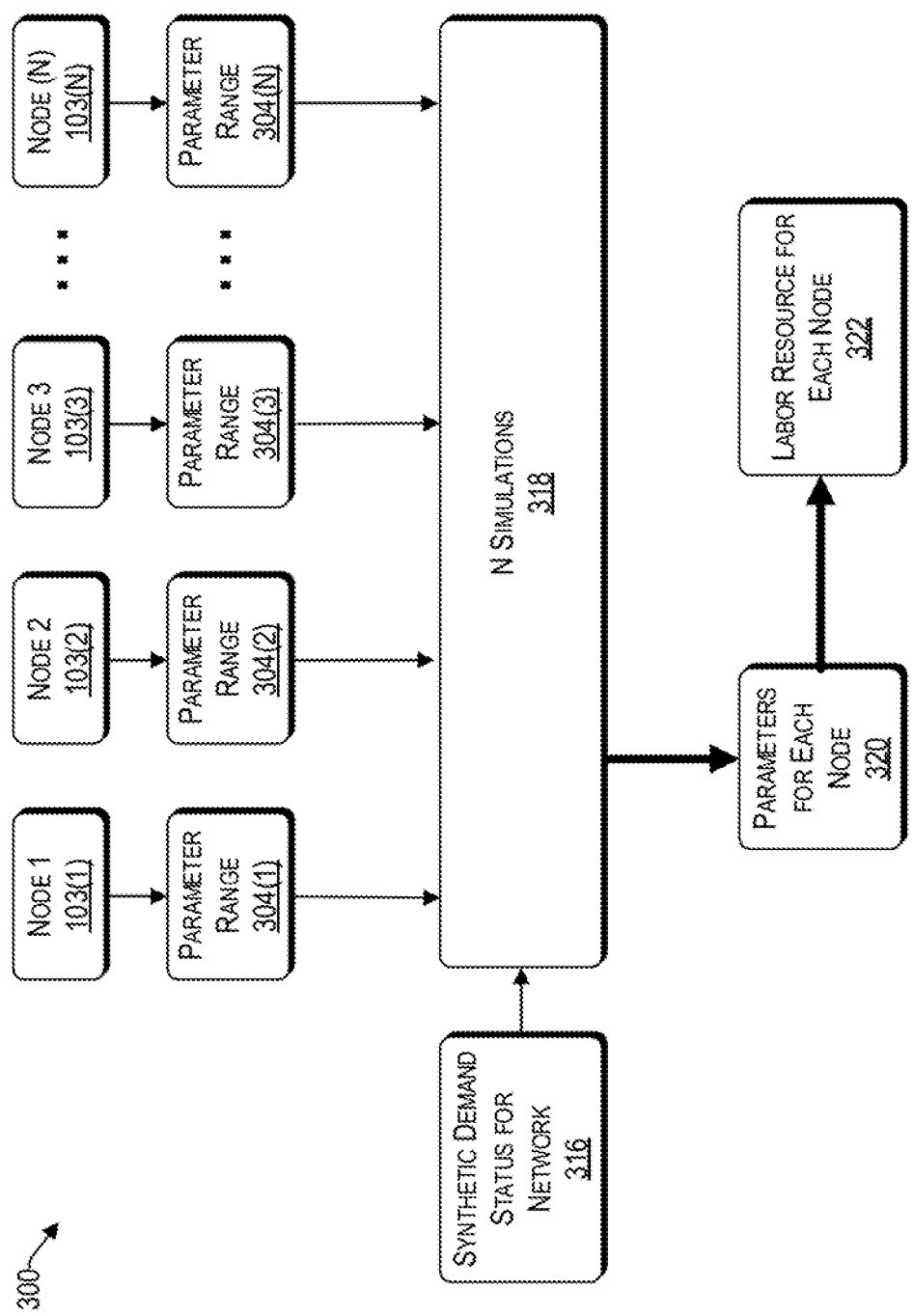
FIG. 3 is a conceptual block diagram of the calculation of the labor resources for each node of an omnichannel distribution system, consistent with an illustrative embodiment.

Reference now is made to FIG. 3, which is a conceptual block diagram of the calculation of the labor resources for each node of an omnichannel distribution system, consistent with an illustrative embodiment. For discussion purposes, FIG. 3 is described with reference to the architecture 100 of FIG. 1. For each node (e.g., 103(1) to 103(N)), the key parameters are identified. In various embodiments, the identification of key parameters is by way of user input or from the business rules database 112. Accordingly, the LRE 105 may interact with the business rules database (e.g., 112 of FIG. 1) to determine the key parameters for each node. Alternatively, or in addition, the LRE 105 interactively communicates with the computing device 142 of the user 141 to display different parameters to choose from for the particular node 103(1) to 103N). In some embodiments, each parameter has an associated weighting factor. For example, node 1 (103(1)) may have 5 key parameters (e.g., parameters A to E). Parameter A may be deemed more significant by the LRE 105, and therefore has a higher weighting factor on an appropriate scale (e.g., 9 in a scale of 1 to 10). Parameters B and C may have a smaller weighting factor (e.g., 8 in the same scale of this example). Similarly, the remaining parameters may have other appropriate weighting factors. In various embodiments, the weighting factors may be provided by the business rules database 112 or may be provided by the user via the computing device 142 (e.g., as input parameters 143).

As discussed previously, each parameter may have a different range. The range for each parameter is determined by the LRE 105 from the synthetic network status information 216 of the determined synthetic scenario 212, represented by blocks 103(1) to 103(N), accordingly. In one embodiment, where a full possible range is not identified in the synthetic network status information 216, the range for the parameter is extended by a predetermined factor (e.g., by one standard deviation). For example, if parameter B is identified to only be in the range of 10 to 15 in the synthetic network status information, then the range can be extended below 10 and above 15 by a predetermined function (e.g., 1 sigma) to explore a broader range in the N simulations 318.

For each node, the optimization of the settings of the key parameters is performed by way of multi-objective optimization. Accordingly, the parameters are optimized in view of multiple objectives to be optimized concurrently, such that the combination of settings of the parameters as a whole accommodate the objectives. For example, the objective may be a highest profit margin, a lowest fulfillment cost, a fastest market growth, etc., for a predetermined period (e.g., week, month, quarter, season, year, event, etc.,). Accordingly, decisions are taken in the context of trade-offs between two or more conflicting objectives. Minimizing fulfillment cost while shortening the shipping time are examples of the multi-objective optimization.

In one embodiment, the optimization model presented in this application minimizes both shipping and load balancing costs simultaneously in a multi-objective optimization framework, as a weighted sum of the objectives over a set of related business constraints. The underlying mathematical calculation in the N simulations 318 includes assigning items (i.e., inventory) to nodes in the fulfillment network so that the cost of shipping packages from the assigned nodes to the customer is minimized and traded off with the cost of balancing order loads across the network, based on a synthetic demand status for the network 316. For example, a node that is most cost effective to meet the goals(s) while accommodating the synthetic demand 316, will be allocated more inventory. Similarly, nodes that may be less cost effective to meet the goal(s) while accommodating a synthetic demand 316, are allocated less inventory. Cost effectiveness may be based on labor rate, shipping cost, proximity to a transportation hub, the type of the transportation hub (truck, train, plain, etc.), and the time for the shipment expected (e.g., same day, 2 day, 5 day, etc.,).

Upon determining the parameters for each node, the labor resource for one or more nodes (e.g., typically all) is determined based on the calculated appropriate inventory for each node 103(1) to 103(N). Below, a general cost structure that includes inventory balancing, node performance and labor cost, as well as load balancing cost is provided. The notation and formulation follows.

The indices, sets, ranges are provided by the expressions below:
- $k \in \mathcal{K}$ set of SKUs (also called interchangeably items, units);
- $i \in \mathcal{J}$ set of order fulfillment nodes (stores, EFCs, etc.,);
- $I_k$ $I_k \subset I$ denotes a subset of nodes from which SKU k can be sourced;
- $K_i$ $K_i \subset K$ denotes a subset of SKUs available at node i;
- $c \in C$ set of available carriers (Different shipping methods from a carrier, such as 1DAY, 2DAYS, GROUND, etc., are considered as different elements of the set.) $C_i \subset C$ denotes subset of carriers available at node i; and
- $h \in 1 \ldots H_c$ incremental unit weight intervals for modeling shipping cost of carrier c.

The data is provided by the expressions below:
$W_{kc}$ billable weight of an item of SKU k for carrier c
$S_{ihc}$ shipping cost of carrier c at node i for a package in weight interval h
$V_{ik}$ current available inventory position of SKU k at node i
$D_k$ demand for SKU k
$C_{ik}$ cost of sourcing SKU k from node i The decision variables are provided by the expressions below:
$u_{ik}$ units of SKU k sourced from node i
$z_{ic}$ binary variable for selecting carrier c at node i
$y_{ihc}$ binary variable for selecting carrier c at node i at weight interval h The system lets $U_{ik} = \min\{V_{ik}, D_k\}$. In one embodiment, the following expressions provide the relevant constraints:

$$\min_{u,z,y} \sum_{i \in I} \sum_{c \in C_i} \sum_{h=1}^{H_c} S_{ihc} y_{ihc} + \sum_{k \in K} \sum_{i \in I_k} C_{ik} u_{ik}, \quad (1.1)$$

$$\text{s.t.} \sum_{i \in I_k} u_{ik} = \min\left\{\sum_{i \in I_k} V_{ik}, D_k\right\}, k \in K, \quad (1.2)$$

$$u_{ik} \le U_{ik}, k \in K, i \in I_k, \quad (1.3)$$

$$\sum_{k \in K_i} W_{kc} u_{ik} \le H_c(1 - z_{ic}) + \sum_{h=1}^{H_c} h y_{ihc}, i \in I, c \in C_i, \quad (1.4)$$

$$\sum_{k \in K} W_{kc} u_{ik} + (1 - z_{ic}) > \sum_{h=1}^{H_c} (h-1) y_{ihc}, i \in I, c \in C_i, \quad (1.5)$$

$$\sum_{h=1}^{H_c} y_{ihc} = z_{ic}, i \in I, c \in C_i, \quad (1.6)$$

$$\frac{1}{\sum_{k \in K_i} U_{ik}} \sum_{k \in K_i} u_{ik} \le \sum_{c \in C_i} z_{ic} \le 1, i \in I, \quad (1.7)$$

$$u_{ik} \in \mathbb{Z}_+, y_{ihc} \in \{0,1\}, z_{ic} \in \{0,1\}. \quad (1.8)$$
$$k \in K, i \in I_k, c \in C_i, h \in 1 \ldots H_c.$$

For example, constraint (1.2) stipulates that the number of units of SKU k sourced is equal to its demand, or to the total availability, whichever is minimum. Constraint (1.3) is the upper bound for units of SKU k sourced at node i. Constraint (1.4) and (1.5) are for setting up the upper and lower limits of the weight intervals for carriers available at nodes. Constraint (1.6) is for providing that exactly one weight interval for a carrier is chosen if the carrier itself is chosen, and that no weight interval is chosen if the carrier is not chosen. Constraint (1.7) serves two functions: (i) Assignment of an SKU to a node forces carrier selection for the node, and also (ii) that only one carrier can be selected at a node.

Shipping cost, as modeled by (1.1 and 1.4-1.7) has two phases. First, a carrier is chosen for a node if the node receives the item assignments (1.6, 1.7). Second, based on the carrier selected, the carrier-specific item weights are added up to obtain a total package weight (1.4, 1.5). Further, an objective function places the corresponding shipping cost for the package based on the weight interval.

The item-node cost, $C_{ik}$, in the objective (1.1) is a weighted combination of various business goals, including load balancing ($LB_{ik}$), inventory balancing ($IB_{ik}$), node performance ($NP_{ik}$), and labor cost ($LC_{ik}$). Weights of business goals goal may be set by the user to be between zero and one. Denoting the weights by $\lambda$, the item-node cost is provided by the expression below:

$$C_{ik} \lambda_{LB} LB_{ik} + \lambda_{IB} IB_{ik} + \lambda_{NP} NP_{ik} + \lambda_{LC} LC_{ik}.$$

For example, load balancing can achieve a balanced workload across the stores (i.e., nodes) in the network. If any one of the nodes happens to have a high (respectively, low) capacity utilization, load balancing will discourage (respectively, encourage) assignment of units to that store. Inventory balancing provides that each node maintains just the right amount of inventory for each item. If a node has excess inventory for an item, inventory balancing will reward the assignment of the item to the node to avoid an eventual mark down situation. Contrarily, if the inventory is falling short, load balancing will penalize the assignment, to avoid a stock out situation based on the synthetic scenario. Node performance cost discourages stores that have proven to cause shipment cancellations in the past. Labor cost denotes labor spent for picking and packing items.

Shipping cost, as modeled by expressions (1.1 and 1.4-1.7) has two phases. First, a carrier is chosen for a node if the node receives item assignments (1.6, 1.7). Second, based on the carrier selected, carrier-specific item weights are added up to obtain total package weight (1.4, 1.5). Finally, objective function places the corresponding shipping cost for the package based on the weight interval.

For example, the objective function is modeled as a cost function using predictive and/or parametric modeling, and the net objective, which can be thought of as total margin, is a weighted linear combination of individual cost functions, where weights are set by the user 141 or provided by the business rules database 112. Individual objective weights provide the flexibility to activate each objective dynamically and include relative importance of different objectives. For example, some retailers view shipping cost as a hard dollar cost and markdown avoidance cost as a soft dollar cost and might desire to trade off more "soft dollars" for a single "hard dollar." In such a scenario, the LRE 105 may set the markdown avoidance cost weight at a fraction of the shipping cost weight.

For each node, to explore every possible permutation of the parameter within its respective range may be computationally demanding for the optimization server 130 and/or the cloud 120. To reduce this computational load, the LRE 105 is configured to determine a number of simulations (N) to perform 318 for the nodes. In various embodiments, the number N may be based on computational resources and/or the accuracy (i.e., resolution) desired. For example, the number N may be limited to a predetermined time limit to come to a conclusion, based on the computational resources available to the optimization server 130 and/or the cloud 120. By virtue of limiting the computation to a focused N experiments (i.e., simulations), the computational demand on the optimization server 130 (and/or the cloud 120 supporting the optimization server 130) for the determination of the values of the parameters for each node is conserved, thereby providing a more efficient computational platform.

Upon determining the parameters for each node based on multi-objective optimization, the labor resources for each node are determined. For example, the labor efficiency is extracted from the synthetic network status. Next, it is determined how long it would take to ship the allocated inventory based on the synthetic labor efficiency of the node, as provided by the expression below:

$$LRT = \frac{AI}{LE}$$

Where:
LRT=labor resources allocated for a node for time period T;
AI=allocated inventory for the node; and
LE=synthetic labor efficiency at the node.

Accordingly, the LRE 105 is configured to determine the appropriate labor resources for each node for any synthetic scenario identified by the optimization server 130. For example, the synthetic scenario may be based on different time periods (e.g., quarter, month, week, next day, shift, etc.,) and for various events (e.g., week before Christmas, sporting event, etc.,). In this way, the labor resources can be calculated for each node.

As discussed above, the N number of simulations to determine the appropriate settings of the identified parameters for a node involve the LRE 105 using data from the synthetic scenario 212. More particularly, data from the synthetic network status 216 is used for the N simulations. Simulating with all the data included in the synthetic network status 216 for that node may be resource intensive in terms of memory, computations, and time for the optimization server 130 and/or the cloud 120. Accordingly, in one embodiment, the data therein is sampled to provide a meaningful representation of the performance of each of the nodes with respect to its key parameters. To that end, in one embodiment, Latin Hypercube Sampling (LHS) is used for computational efficiency, wherein near-random sample of values from the multidimensional distribution of the synthetic network status data is used by the LRE 105. When sampling a function of K parameters of a node, the range of each variable is divided into M equally probable intervals, where M sample points are used to satisfy the Latin hypercube. Thus, the number of divisions (M) is equal for each variable.

In one embodiment, Orthogonal Latin Hypercube Sampling (OLHS) is used, where the sample space of the data is divided into equally probable subspaces, sometimes referred to herein as parameters. All sample points can then be chosen simultaneously by the LRE 105, thereby providing a total collection of sample points as a Latin Hypercube sample and wherein each subspace is sampled with the same density. Accordingly, in contrast to random sampling, where sample points are generated without taking into consideration the previously generated sample points, in the OLHS performed herein, the sample space is divided into equally probable subspaces such that the sample points are each a Latin Hypercube sample and each subspace (i.e., parameter) is sampled with the same density.

Figure 4:
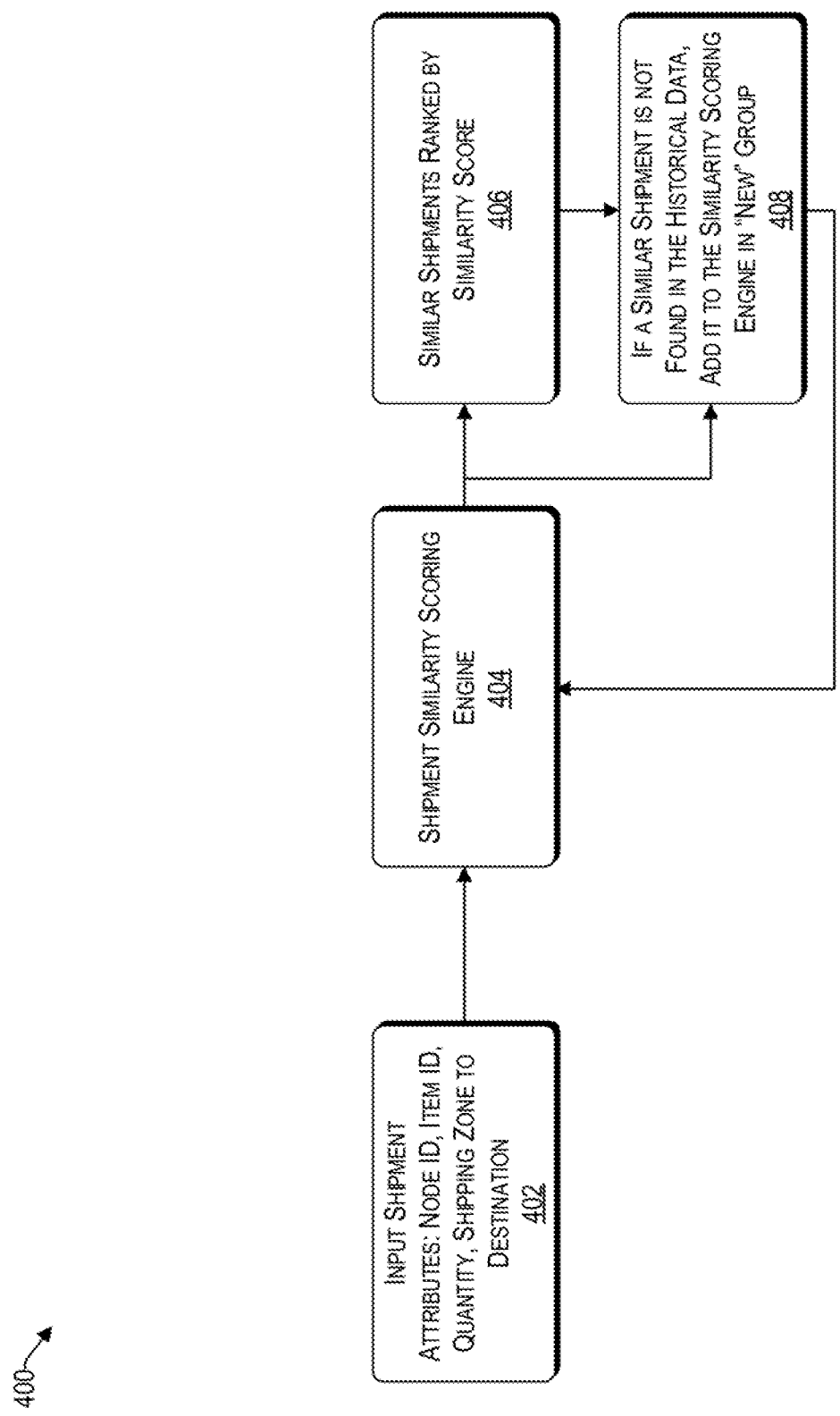
FIG. 4 describes a block diagram for determining a preferred packaging of a shipment, consistent with an illustrative embodiment.

Reference now is made to FIG. 4, which describes a block diagram 400 for determining a preferred packaging of a shipment, consistent with an illustrative embodiment. It is noted that during an online order fulfillment, a bundle of items is assigned to a node for fulfillment (i.e., a shipment). A picker (i.e., part of a labor resource at a node) typically picks these items and packs them in available box(es) for shipping. The number of boxes depends on the size, weight, and specification of items, and size and specification of available boxes. Traditionally, this often involves human judgement.

When a shipment involves multiple order lines, there may not be a suitable guideline on how to best pack the items, which may involve multiple boxes. Multiple boxes may mean higher shipping costs. Sometime a single big box (as opposed to a few smaller boxes) may also have a higher shipping cost due to dimensional pricing by carriers. Also, carriers have different specifications on the boxes they carry.

Although there may be services that provide limited guidance on how to package products, they typically don't account for the space required for the packaging material. In this regard, FIG. 4 provides a system for packaging products. For example, a computing device at a node may receive shipment attributes (i.e., block 402). These attributes may include the node ID, item ID, quantity, shipping zone to destination, etc. At block 404, the computing device refers to a shipment similarity scoring engine 404 to identify from historic data how a similar shipment was handled before. At block 406, similar shipments are ranked by virtue of a similarity score. At block 408, if a similar shipment is not found in the historical data, it is added to the shipment similarity scoring engine as a "new" group. In various embodiments the source of the historical data may be a memory of the node and/or the order repository 114 of FIG. 1.

Figure 5:
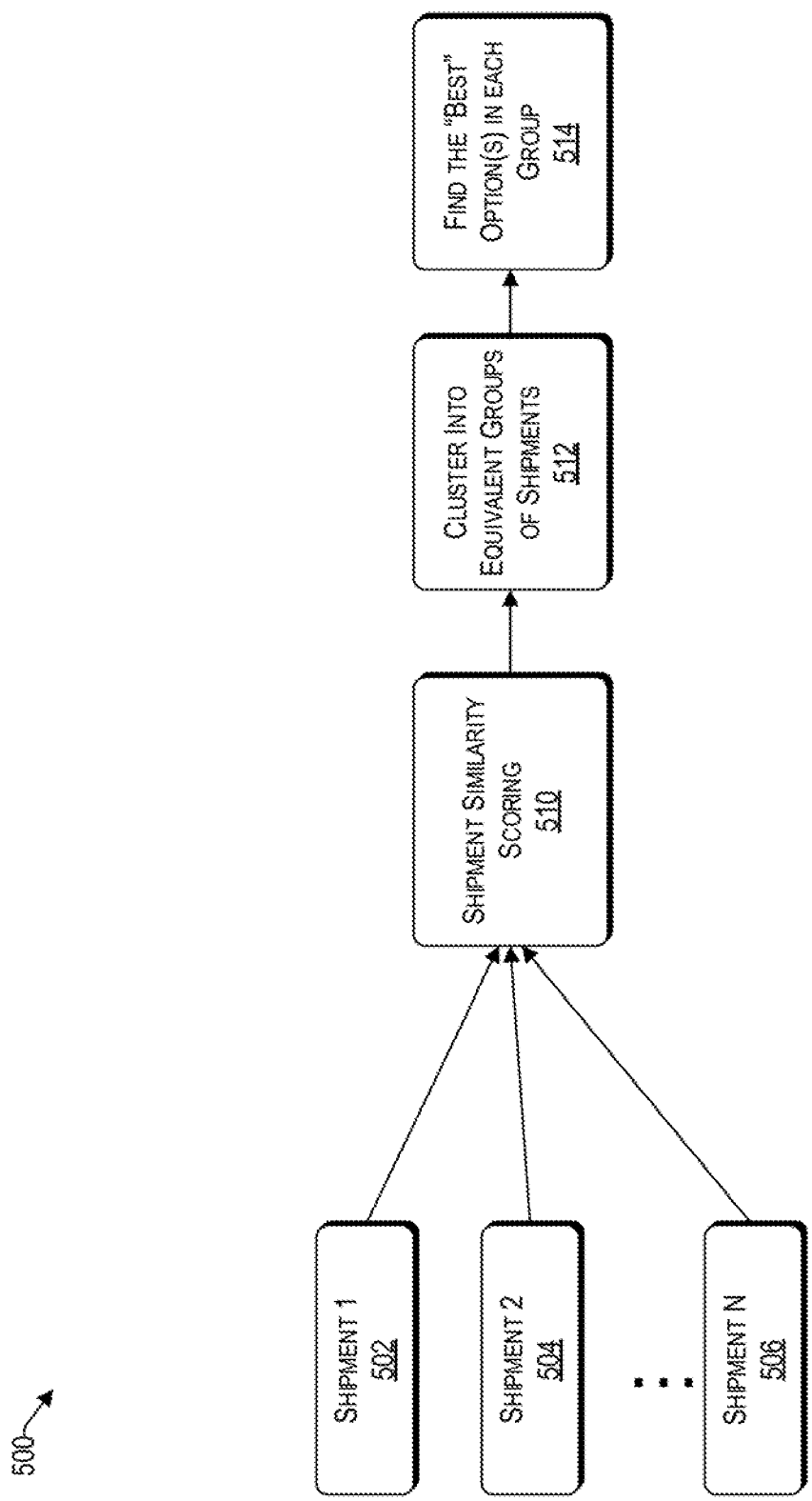
FIG. 5 is a conceptual block diagram of a product packaging system, consistent with an illustrative embodiment.

FIG. 5 is a conceptual block diagram of a product packaging system 500, consistent with an illustrative embodiment. For example, there may be a plurality of shipments N represented by blocks 502 to 506. Each shipment has a node ID, a destination ID, and shipping zones to the destination. There is also an item ID associated with the product hierarchy information, including the price thereof. The shipment attributes may also include the item dimensions, such as height, depth, width, and weight. In some embodiments, the shipping time is included. Also, there may be a special product grouping code, such as chemicals belonging in a code category. This shipping code is used to identify an aggregate shipping score for a shipment (i.e., block 510). Past carrier-mode selections may include the SLA days and dimensional factors. The boxes selected in the past may be based on box dimensions (e.g., height, depth, width, weight limit, etc.,). The product assignments to the boxes and the shipping prices for each box are additional salient factors in past selections.

At block 512 of the system 500, each shipment is clustered into an equivalent (e.g., similar) group of shipments. For example, shipment similarity can be evaluated based on the shipment attributes. In this regard, one or more similarity learning algorithms can be applied. These algorithms can also include learning methods that use hierarchical clustering or nearest-neighbor based clustering. Consequently, the prior packaging that has the closest score in the group is used as a guide for the new shipment.

Figure 6:
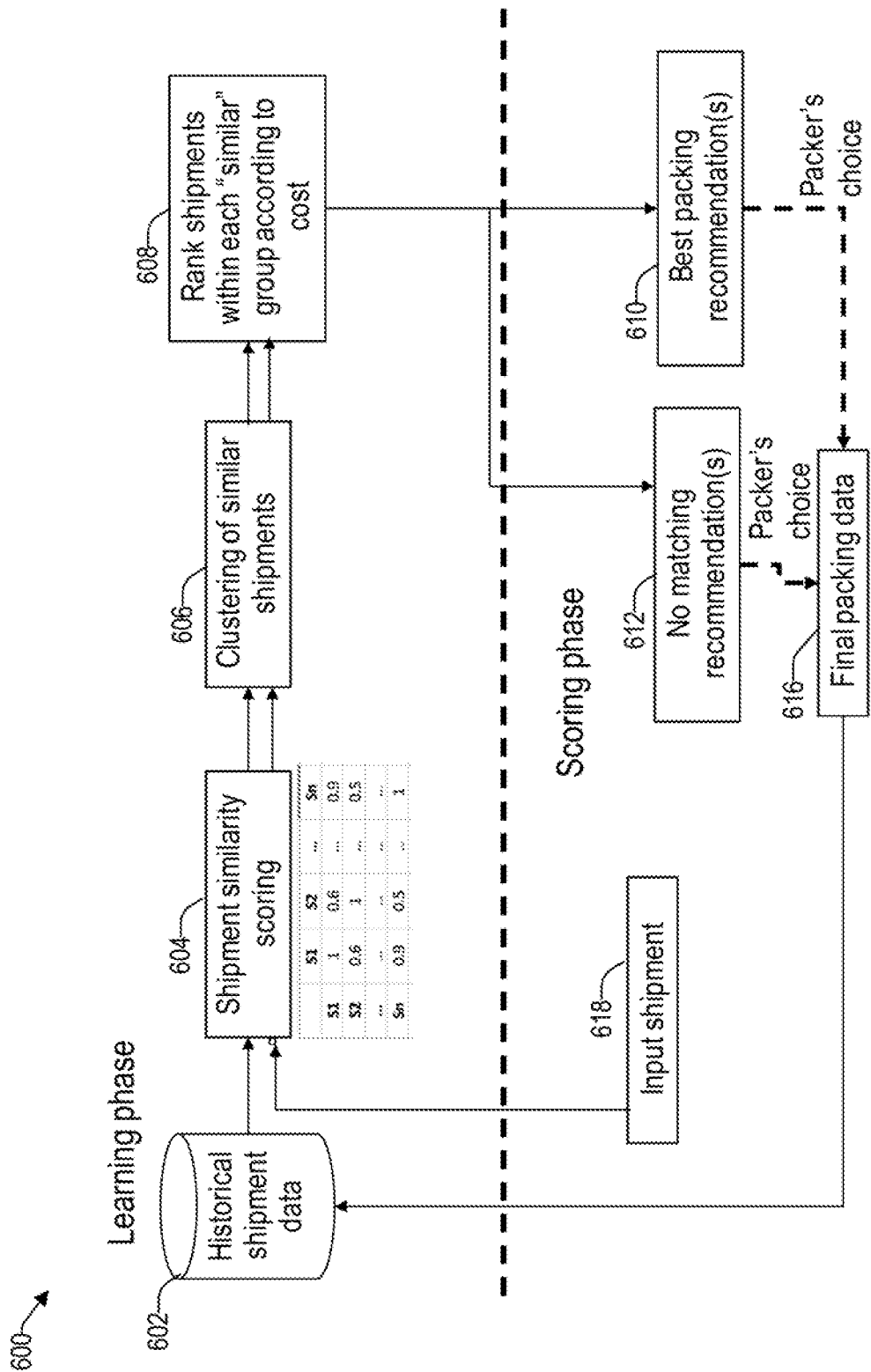
FIG. 6 is a more detailed conceptual block diagram of a product packaging system, consistent with an illustrative embodiment.

FIG. 6 is a more detailed conceptual block diagram 600 of a product packaging system, consistent with an illustrative embodiment. The system is divided in to a learning phase and a scoring phase. The learning phase includes extracting historical shipment data 602. At block 604 a shipment similarity scoring is performed 604 by the computing device of the node. The similarity between historical shipment data 602 and the input shipment data 618 is identified. At block 606 similar shipments are clustered together into a same category. At block 608, each shipment is ranked according to cost.

After the learning phase, the system continues with the active scoring phase. To that end, in various embodiments, the best packing recommendation(s) are retrieved (block 610) and used as a guide for the final packaging data 616. However, if there are no matching recommendation(s), the decision for packaging is left to the administrator, sometimes referred to herein as the picker. In one embodiment, the final packaging data is stored in the historical shipment repository (602).

Figure 7:
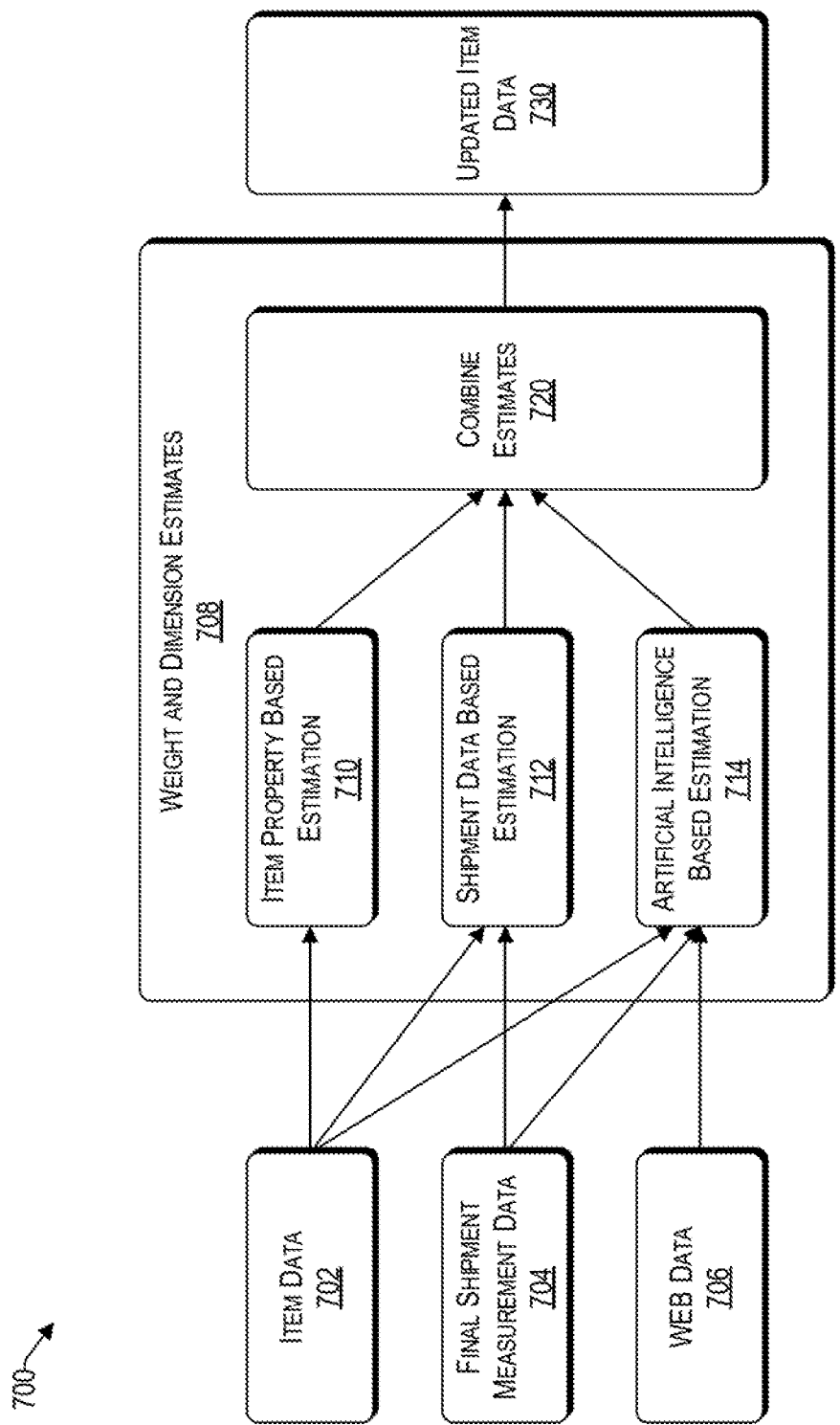
FIG. 7 is a conceptual block diagram of a system to determine a property of a shipping item.

As part of managing, planning for, and carrying out E-Commerce order fulfillment, retailers and their fulfillment engines can track and make use of SKU (e.g., product item) weight and dimensions (e.g., height, width, and depth). For example, this information may be provided to customers, used in monitoring fulfillment (e.g., weight trend for items shipped recently), and used by a fulfillment engine, e.g., in estimating shipping cost. Accordingly, having accurate weight and dimensions values for items is salient, and lacking such can end up being costly to the retailers. Nonetheless, many retailers struggle with very poor item data—often many items are missing one or more dimension and weight values, or have inaccurate values recorded. Accordingly, in one embodiment, a system and method for automatic data-driven estimation of the item weights and dimensions is provided, in order to obtain more accurate values for the item weights and dimensions and fill in missing values—using data that is may already available to retailers. In this regard, reference is made to FIG. 7, which is a conceptual block diagram of a system to determine a property of a shipping item. The item data 702 includes the weight and dimensions of the product, the product hierarchy, text descriptions of the product, and possibly other relevant indicators, such as color and size. The final shipment measurement data 704 includes, for each container or package, its weight and dimensions, which can be used by a carrier to determine shipment cost. The WEB data 706 includes the item weight and dimensions of the product. The WEB can be viewed as a general knowledge base regarding the product that may include various properties of the product.

One or more of the sources of data 702, 704, and 706 can be used to determine the weight and dimensions of a product 708. For example, item data 702 can be used to estimate 710 the weight and dimensions of a product. The existing item data can be used to infer item values. For example, the product hierarchy and other item details can be used as features to find similar known products that do not have missing values. In some embodiments, the missing parameters can be interpolated or extrapolated from known products.

In one embodiment, shipment data based estimation 712 can be performed. To that end, the item data 702 and/or the final shipment measurement data 704 can be used. For example, the shipment data includes accurate measurements for packages and containers. However, these measurements typically correspond to more than one item. By using various measurements, a computing device can infer the unknown values for individual items, essentially by solving a system of equations.

In one embodiment, artificial intelligence based estimation 714 can be performed by a computing device. For example, natural language understanding and active knowledge acquisition based estimation techniques can be used. The item descriptions and properties can be used to search knowledge bases for characteristics of relevant properties, as well as searching the WEB for weight and dimension information for similar items.

The computing device combines the estimates 720 from different estimation methods 710, 712 and 714. For example, a weighted average can be taken, with weights reflecting an estimated accuracy of the method. Consequently, the item data is updated 730. For example, the estimated weight and dimensions are provided in connection with the product for reference. The more complete information about the product can drive fulfillment decisions, which could lead to new shipment data to be used to update the values, thereby continuing the iterative process.

Figure 8:
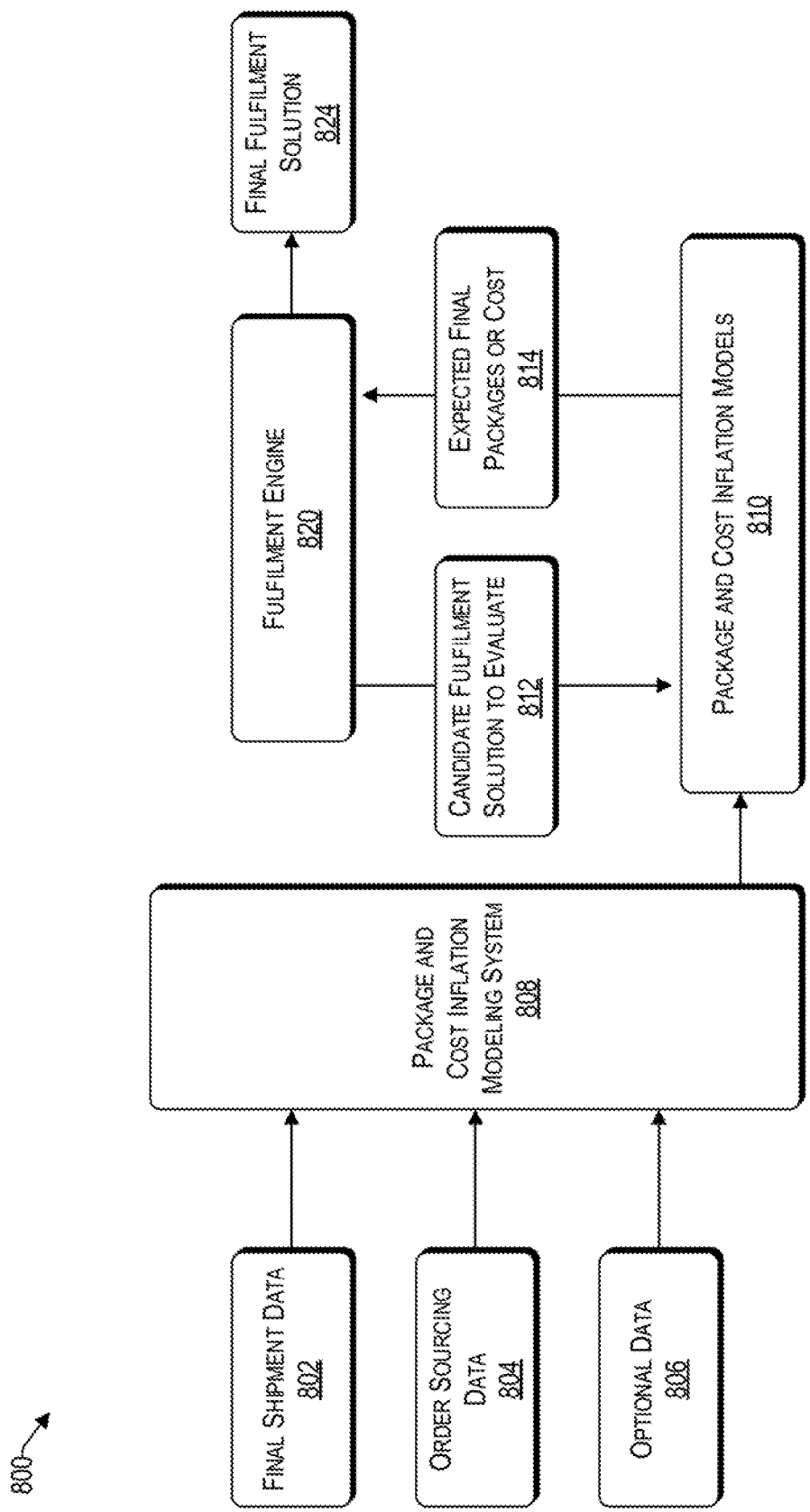
FIG. 8 is a conceptual block diagram of a system that accurately predicts a cost of shipment for a fulfillment solution.

As discussed previously, items originally assigned to a single node may be split into more than one package. The splitting can vary based on the particular node, set of products, and other characteristics. Such splitting can lead to inaccurate cost estimates and sub-optimal fulfillment decisions in prior art systems. Accordingly, in one embodiment, a system and method are provided by which the expected actual number of packages or cost is accurately predicted for a particular assignment of a fulfillment solution. That is, given a solution for one estimated package (e.g., 5 items assigned to a given node)—the actual number of packages we would expect out of that assignment is provided, essentially determining the package inflation in each case. In this regard, reference is made to FIG. 8, which is a conceptual block diagram of a system that accurately predicts a cost of shipment for a fulfillment solution. In the example of FIG. 8, the inputs to the package and cost inflation modeling system 808 include the final shipment data 802 and the order sourcing data 804. In one embodiment, optional data 806 is included, such as item weights, node types, and the like.

The final shipment data 802 includes information regarding the cost for packaging. The order sourcing data 804 includes information regarding which items were assigned to which node. Alternatively, or in addition, the final shipment data 802 may include predicted packages for each order.

Given historic data, the package and cost inflation modeling system 808 is able to determine what happened to each order assignment to a node. If considering only the starting package or cost, the package and cost inflation modeling system 808 simply estimates a single factor per node (i.e., inflation ratio of the node from historic data). More accurate and sophisticated models can be used that include additional features, such as weight, dimensions, etc.

The package and cost inflation model block 810 receives the package and cost inflation modeling information and creates a model therefrom to be able to map the input cost to the final expected inflated output cost. The expected final packages or cost 814 is provided to the fulfillment engine 820, which evaluates different fulfillment solutions to try and pick the one with the lowest cost. In one embodiment, this process is iterative in that the candidate fulfillment solution to evaluate 812 is provided to the package and cost inflation models block 810. For example, it provides a node, any key characteristics used and the starting cost if it is cost-based.

The input data can change based on available data for the retailer. For example, a retailer may prefer to use only the input number of packages or cost when computing the inflation rates, or based on the assignment total.

A basic inflation model considers only the node and estimates a fixed inflation rate per node from historic data. This can be periodically updated to reflect current trends for a node. for cost, the basic inflation model corresponds to regression in one dimension. For example, different regression techniques can be used to fit the expected cost inflation, such as non-parametric regression.

More sophisticated models can take into account additional/multiple factors, and can also share learning across node tasks. By way of example, consider a node based on two factors: (i) weight, and (ii) quantity. In this regard, the expected final packages for node n=f(x), where x is a vector of $x_1, x_2, x_3, \ldots, x_p$. The key factors in the model are used to determine the expected value (i.e., inflation). For example, $x_1$=total weight of items assigned to node/package, $x_2$=total quantity, $x_3$=hour of day, $x_4$=current backlog days at node, $x_5$=total volume of items, etc. Based on kernel regression, the following example model is provided:

$$f(x) = \frac{\sum_i y_i K(x_i, x)}{\sum_i K(x_i, x)}$$

Where:
x_i and y_i correspond to the key factors (features), respectively, and corresponding final number of packages or cost for historic cases indexed by i, and K(.,.) is a kernel function.

For example, a function capturing the similarity between a historic case and the current case based on the set of key indicators/features.

It will be understood that a customer may have multiple products in an online shopping basket. Even though the omnichannel distribution system of a retailer may offer a free shipping cost option or a flat rate shipping option to a customer, oftentimes, the retailer pays a shipping cost to a shipping carrier that depends on the shipping weight (which may be dimensional weight) and shipping zone (approximately related to the distance between the origin and destination) given the delivery days option selected. Usually the shipping rate changes in quantum values of shipping weights (e.g. for 10-12 lbs shipping weight, a retailer might be paying a flat shipping cost to the carrier).

Figure 9:
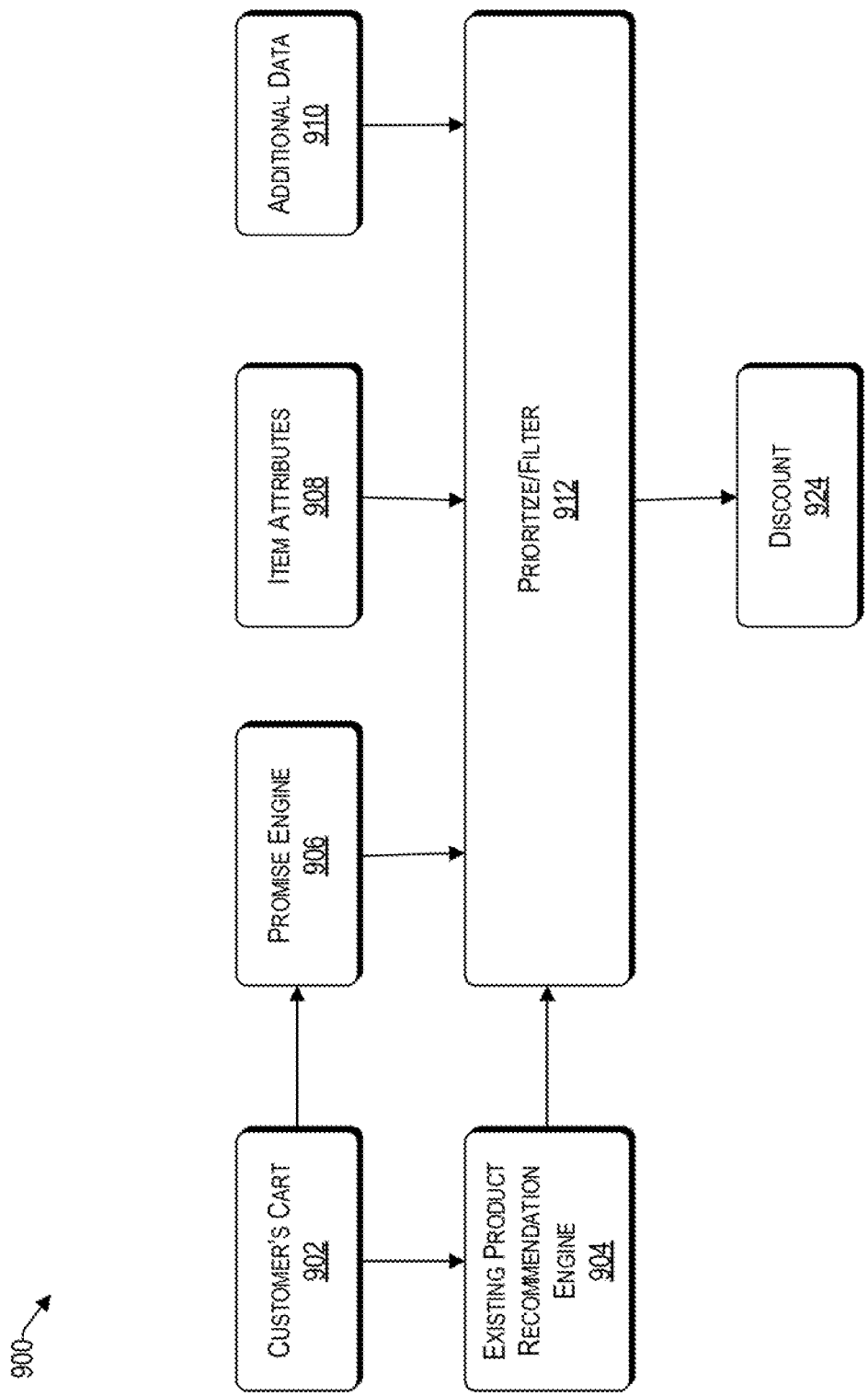
FIG. 9 is a conceptual block diagram of a system to prioritize product recommendations based on the shipping cost.

By way of example, if a customer has selected products weighing up to 10 lbs, additional products can still be added that can be shipped at no additional cost to the retailer. In one embodiment, a computing device of a node is configured to leverage the flat shipping cost choices in shipping weight/zone brackets to make additional recommendations to the customer's. In this way, a customer is encouraged to purchase additional products to take advantage of the shipping bracket. In this regard, reference is made to FIG. 9, which is a conceptual block diagram of a system to prioritize product recommendations based on the shipping cost. For example, a customer's cart 902 may include various items. The items are provided to an existing product recommendation engine 904 and a promise engine 906. The promise engine 906 takes into account the available inventory and may recommend an appropriate zone and/or node from which the inventory can be fulfilled.

Since the sourcing node assignments may not always be done at the time of promising, the recommendations from the existing product recommendation engine 904 could be limited to a set of products with high inventory levels so that recommendation decisions do not lead to package splits. The existing product recommendation engine 904 can be based on rule mining, customer data, and/or collaborative filtering.

The prioritize/filter block may receive additional item attributes or other additional data 910. For example, item attributes 908 may include the weight and dimensions of each item. Additional data 910 may include rate card data, node carrier availability, transit day data, shipping box availability for different carrier-modes with dimensions and weight limits, etc.

Accordingly, the product prioritize/filter block 912 may consider various criteria, such as maximizing total revenue, profit margin, and/or association rule weightage, etc. Consequently, the prioritize/filter block 912 of the computing device of a node can offer a discount 924 on selected products based on the shipping cost savings.

For example, a customer's cart may include two t-shirts, each weighing 0.75 lbs. The computing device of the node understands that the cost of shipment is the same until 1.5 lbs. Accordingly, based on the flat shipment rate until the first threshold (i.e., 1.5 lbs) in this example, the computing device can promote an item that falls within the same weight (and size limitation) category, thereby offering the customer an incentive to buy additional products, while not incurring additional cost related to shipment.

As part of managing, planning for, and carrying out e-commerce order fulfillment, retailers and their fulfillment engines can track and make use of a number of estimated fulfillment network performance characteristic rates. For example, the cancellation rate at nodes, or the sales rate (velocity), or return rate, etc., can be considered. These estimated rates can be used by the retailers in planning and making decisions about the fulfillment network and process, and by the fulfillment engines themselves. For example, in traditional omnichannel distribution systems, a high estimated sales rate at a particular node may lead to an increase of the staff at that node. A fulfillment engine, such as the LRE discussed herein, may decide to penalize assigning orders to nodes with higher cancel rates, to avoid assigning too many orders there.

To estimate these performance characteristic rates, retailers may take the approach of looking at a recent historical rate. However, at a fine-grained level, such as at the level of an individual node and item—the data may be sparse—i.e., there may not be many recent historical cases at that level for the average rate to be very accurate—so that the historic rates themselves can be uncertain. On the other hand, taking the rate at a higher level (i.e., at an aggregated level, such as across all items in the same subclass), might result in a more stable rate, but might also be less accurate when applied to a particular item in that group. The determination of the performance characteristic rates is a salient parameter(s) to be determined for retailers. Retailers currently do not have a good way to take into account all the different data/rates across different levels of aggregation, or to determine what level of aggregation should be used. Further, retailers would like to be able to determine an appropriate level of aggregation on a case-by-case basis. The known rate estimation approaches typically do not account for the uncertainty in the estimation—for example if there are too few data points at the chosen aggregation level.

Figure 10:
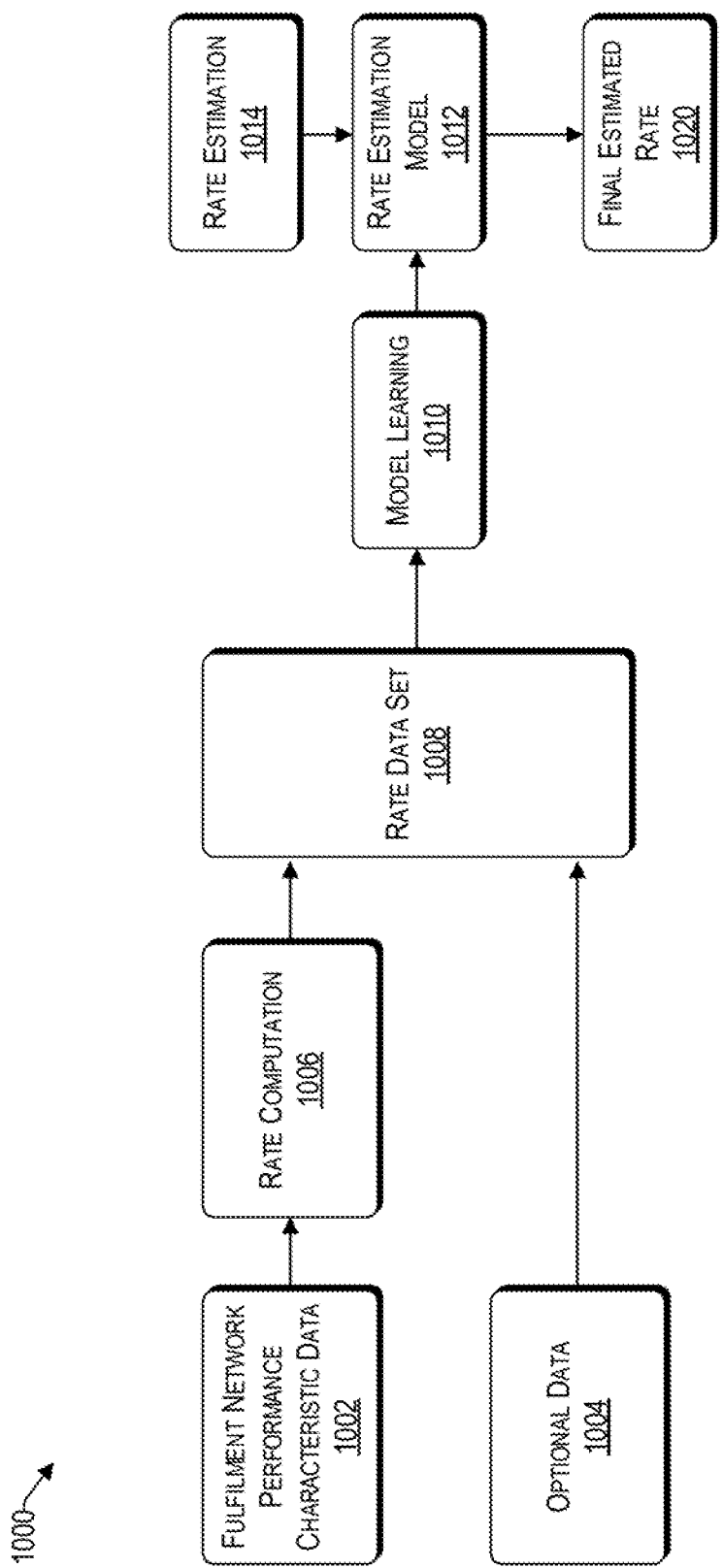
FIG. 10 is a conceptual block diagram of a system that is operative to prioritize product recommendations based on the shipping cost.

Accordingly, in one embodiment, what is provided herein is a system and method for automatically estimating the performance characteristic rates in a data-driven manner, factoring in the data across all levels of aggregation and the support at each level. In this way, the data sparsity issue is accommodated, thereby leading to more accurate predicted performance characteristic rates, which will in turn drive better decisions. In this regard, reference now is made to FIG. 10, which is a conceptual block diagram of a system 1000 that is operative to prioritize product recommendations based on the shipping cost. For example, the optimization server 130 may have an engine, which may be part of the LRE 105 or separate therefrom, to determine performance characteristic rates. For example, there is a fulfillment network performance characteristic data 1002 based on historical data. For example, for sales rates, point of sale or transaction log data can be used. For cancellation rate, the order-line sourcing status historical data can be used.

The fulfillment network performance characteristic data 1002 can be used for rate computation 1006. For example, there can be three dimensions along which aggregation can be performed: (i) time (e.g., past hour, past 3 hours, past day, past 2 days, etc.,) (ii) item hierarchy (e.g., individual item level, style level, subclass level, etc.,) and (iii) location/node (e.g., the individual node, at either nearby or similar nodes, at large cluster of regional/similar nodes, etc. In one embodiment, additional optional data 1004 may be used. For example, the additional data may be related to item cost, day of the week, season of the year, etc., thereby providing higher granularity.

There is a rate data set module 1008 configured to receive the data from the rate computation module 1006 and the optional data module 1004 to determine a target value for each data instance, which is the current rate being estimated (e.g., the current day's rate, where the features are derived from all previous dates).

There is a model learning module 1010 operative to provide feature support and/or uncertainty sensitive rate estimation. Models are generated for rate estimation that take into account the uncertainty and/or support of the features. Different models and configurations thereof (e.g., parameter settings) are evaluated by repeatedly holding out subsets of the historic data to test the rate estimation. In various embodiments, three different approaches can be used to include multi-levels and support. In a first example, an optimal minimum support is learned from historical data. A lowest level is then selected that meets the support.

In a second example, a function is learned from the input rates at all levels that are a function of the support for the rates. For example, the weights for a combination of the rates at all levels are a function of the support for the rates. The weights are a function of the support and optionally the values themselves. In that way, the function learned will capture the relationship between the support and the best weights for the rates. For example, if support is high for the lowest-level rate, then it will have a higher weight, if its low, then a higher level will have a higher weight instead.

In a third example, integration is performed of the underlying probability model via Monte-Carlo sampling for learning and inference. For example, additional pseudo training examples are generated by sampling from the underlying posterior distributions for the features, given the samples seen so far. Thus, for rates with fewer samples, the distribution is less certain, so there may be more variance in the features generated.

There is a rate estimation model module 1012 that is configured to receive the most effective model and configuration from the model learning module 1010 and current historic rates across dimensions along with support and key features from a rate estimation module 1014. The rate estimation module 1012 provides a formula for how to derive a final estimated rate, given the inputs of the current historic rates at different dimension combinations, their support, and any key relevant features. Consequently, a final estimated rate 1020 is provided after factoring rates at different aggregation levels/dimensions.

Accordingly, what is provided by the system 1000 is a way of including historic fulfillment network performance characteristic data, as well as possibly other relevant fulfillment network data, into learning performance characteristic rate estimation models. Data sparsity is addressed in estimating fulfillment network performance characteristic rates via several different learning methods, including determining the right minimum support for increasing the aggregation level, learning a function based on the support for how to combine the rates at different aggregation levels and dimensions, and implicitly including the uncertainty in the rates in the learning and inference tasks. A rate estimation is enabled to be performed dynamically, on a case-by-case basis, such that the estimation can essentially be adjusted for each individual case to achieve a best possible accuracy for that case. In one aspect, data and information across multiple dimensions and aggregation levels is included when estimating the fulfillment network performance characteristic rates. The best dimensions and levels of aggregation for estimating the particular rates is determined. Further, the accuracy of a particular rate estimation can be determined.

In one embodiment, lost sales are reduced by improving the notion of ordering online and returning at different locations of the omnichannel distribution system 104 of FIG. 1. One challenge with returning a purchased item to an arbitrary node is that it could lead to lost sales and/or reduced revenue, because the item may have been sourced from a node with high demand and/or low inventory for the item, but was later returned to a node that has marked down the item due to inventory surplus. Further, different nodes may have different holding costs to store an unwanted item than others. For example, a node in Manhattan may be more expensive to store a returned item than another location, where retail space is cheaper. Accordingly, in one embodiment, the optimization server 130 may have an engine, which may be part of the LRE 105 or separate therefrom, to include a return cost computation module. the return cost computation module is operative to determine what the return cost is for various nodes in the omnichannel distribution system 104. In some embodiments, returns from to one node are encouraged by providing financial incentives (e.g., no restocking fee), while return to other nodes is discouraged (e.g., higher restocking fee).

Figure 11:
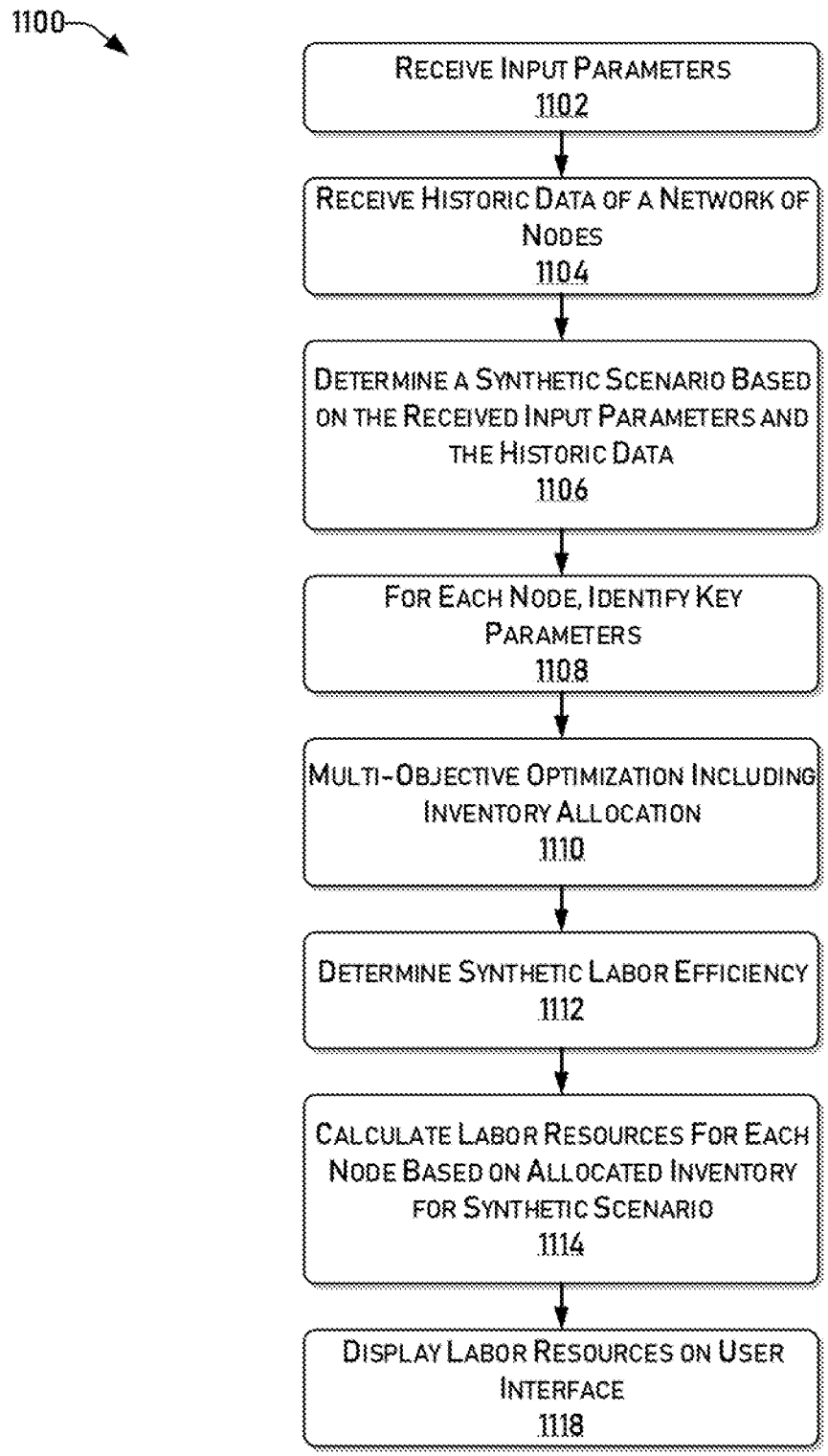
FIG. 11 presents an illustrative process for allocating labor resources for a node in a network of nodes for multi-objective optimization, consistent with an illustrative embodiment.

With the foregoing overview of the architecture 100 of a system for allocating labor resources for multi-objective optimization, and a discussion of a diagram of a system 200 for setting node parameters and labor resources for nodes of an omnichannel network of nodes, it may be helpful now to consider a high-level discussion of an example process. To that end, FIG. 11 presents an illustrative process 1100 for allocating labor resources for a node in a network of nodes for multi-objective optimization, consistent with an illustrative embodiment. This process may be performed by the LRE 105 of an optimization server 130. Process 1100 is illustrated as a collection of blocks in a logical flowchart representing a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 1100 is described with reference to the architecture 100 of FIG. 1.

At block 1102, input parameters are received by the LRE 105 from the computing device 142 of a user 141. In some embodiments, the input parameters are not provided in a single data packet; rather, the input parameters are provided by way of iterative communication between the computing device and the LRE 105. For example, the user 141 may provide an initial set of parameters, which are iteratively finetuned by the LRE 105 asking interactive questions. The iterative communication may include the user being prompted one or more interactive forms that are displayed on a screen of the computing device 142, where the user can enter parameters or make binary selections from a list of options.

At block 1104, historic order data 115 is received by the LRE 105 from an order repository 114 at predetermined intervals or upon a trigger event (e.g., in response to a request from the LRE 105). The historical data includes raw data of orders (i.e., demand data) of one or more products offered by the network of nodes 103(1) to 103(N) of the omnichannel distribution system 104. The historical data also includes raw data of performance parameters (i.e., network status data) of each node in the network of the omnichannel distribution system 104. The network status data may include the labor efficiency of each node. In various embodiments, the raw demand data and the raw network status data may be received by the optimization server 130 separately or in the same data packet from the order repository 114.

At block 1106, a synthetic scenario is identified by the LRE 105. The synthetic scenario data comprises: (i) synthetic demand based on the received input parameters and the historical data, and (ii) a synthetic network status based on the received input parameters, the historical data, and the synthetic demand status. The synthetic network status includes a synthetic labor efficiency, which represents a simulated labor efficiency based on a simulated scenario.

At block 1108, for each node, key parameters are identified by the LRE 105. The identification of the key parameters is determined from at least one of: (i) user input parameters, and (ii) from the business rules database 112.

At block 1110, the LRE 105 performs multi-objective optimization to determine the settings for key parameters for each node. The multi-objective optimization includes inventory allocation for each node. The more cost effective a node is calculated to be for a subject synthetic scenario, the more inventory is allocated thereto.

In one embodiment, the multi-objective optimization includes the LRE 105 determining a range of values for each parameter based on the synthetic scenario. For example, the synthetic network status 216 provides the minimum, maximum, median, and average values for each parameter. From this information, the LRE 105 can determine the relevant range. As mentioned previously, in one embodiment, where a full possible range is not identified from the synthetic network status information 216, the range for the subject parameter is extended by a function (e.g., by one standard deviation).

In one embodiment, the multi-objective optimization includes the LRE 105 applying Orthogonal Latin Hypercube Sampling (OLHS) to the synthetic scenario data based on the identified key parameters to create sampled data. In this way, the volume of the data that is to be processed by the LRE 105 (and by extension the optimization server 130 and/or the cloud 120) is substantially reduced.

In one embodiment, the multi-objective optimization further includes the LRE 105 determining a number of simulations N to perform. For example, the number N may be limited to a predetermined time limit to come to a conclusion, based on the computing resources available to the optimization server 130. In this way, the computing resources and energy cost of preforming the N simulations is managed.

In one embodiment, multi-objective optimization includes the LRE 105 performing a first simulation of the N identified simulations to determine a cost factor of the present set of parameters. In other embodiments, all N identified simulations are performed concurrently, based on the available computing resources. In various embodiments, the cost factor may be based on fulfillment cost and/or capacity utilization for a predetermined time period. As used herein, capacity utilization refers to the extent to which the productive capacity of the omnichannel distribution system 104 is used with reference to its capacity. It is the relationship between a calculated expected output for the present parameter settings and the potential output that could be produced with it, if capacity was fully used. The higher the deviation from full capacity is attributed as a higher cost. The multi-objective optimization includes determining a total cost factor in view of the multiple objectives for the subject node of the omnichannel distribution system 104.

At block 1112, the LRE 105 determines the synthetic labor efficiency for one or more nodes. For example, the synthetic network status of the synthetic scenario data includes a synthetic labor efficiency for each node. This synthetic labor efficiency can be extracted therefrom for the subject node(s).

At block 1114, the LRE 105 calculates the labor resources for each node based on an allocated synthetic inventory and the synthetic labor efficiency for a synthetic scenario.

In one embodiment, at block 1118, the calculated labor resources for the one or more nodes is displayed on a user interface of a user device (e.g., 142).

Figure 12:
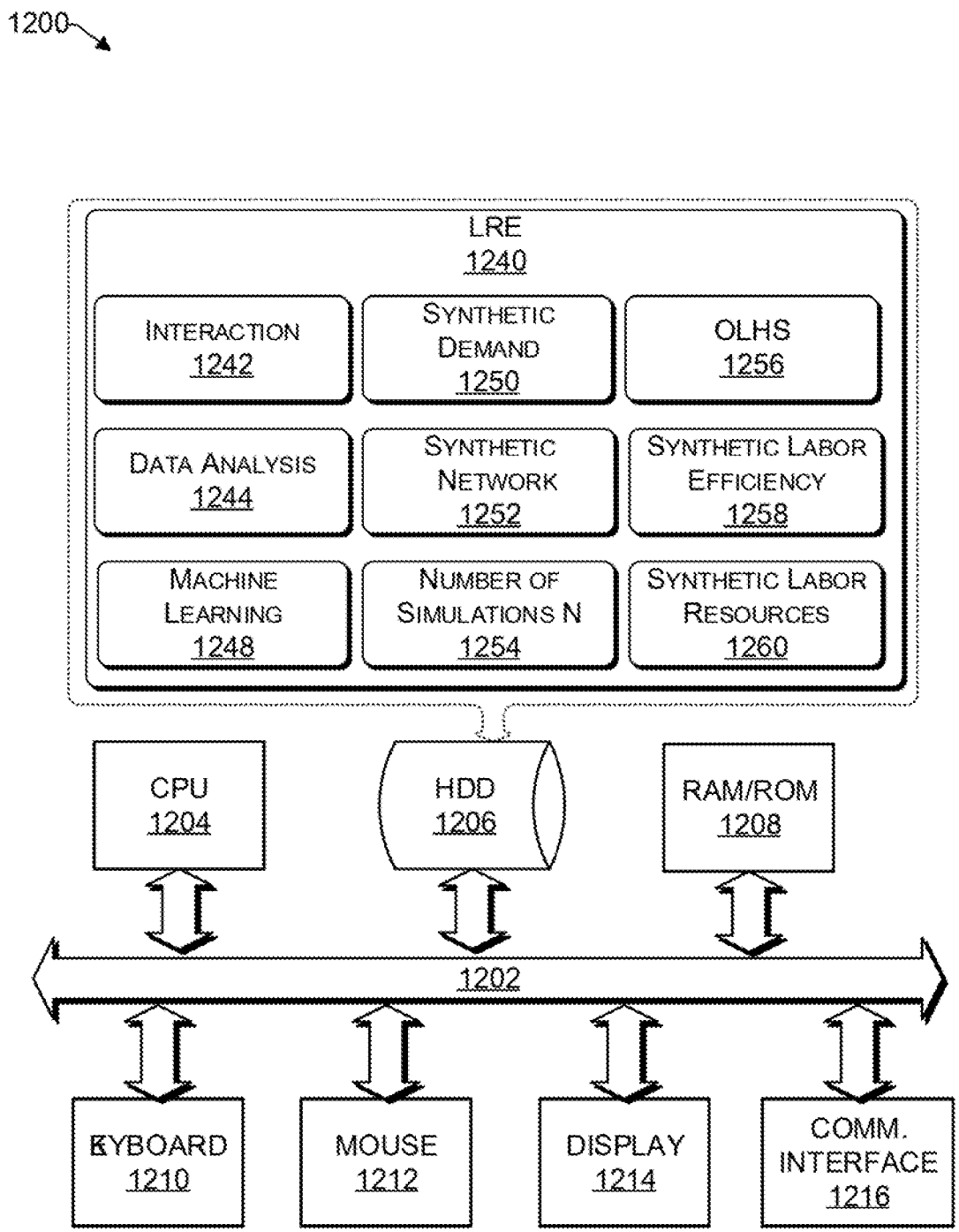
FIG. 12 provides a functional block diagram illustration of a computer hardware platform that may be used to implement the functionality of the optimization server of FIG. 1.

As discussed above, functions relating to for allocating labor resources for multi-objective optimization, can be performed with the use of one or more computing devices connected for data communication via wireless or wired communication, as shown in FIG. 1 and in accordance with the process of FIG. 11. FIG. 12 provides a functional block diagram illustration of a computer hardware platform 1200 that may be used to implement the functionality of the optimization server 130 of FIG. 1.

The computer platform 1200 may include a central processing unit (CPU) 1204, a hard disk drive (HDD) 1206, random access memory (RAM) and/or read only memory (ROM) 1208, a keyboard 1210, a mouse 1212, a display 1214, and a communication interface 1216, which are connected to a system bus 1202.

In one embodiment, the HDD 1208, has capabilities that include storing a program that can execute various processes, such as labor resources engine (LRE) 1240, in a manner described herein. The LRE 1240 may have various modules configured to perform different functions to determine the labor resources for each node. For example, there may be an interaction module 1242 that is operative to receive electronic data from various sources, including historical data 115 from the order repository 114, input parameters from a user device 142, business rules 113 and key parameters of nodes, from a business rules database 112 and/or other data that may be in the cloud 120.

In one embodiment, there is a data analysis module 1244 operative to determine a demand status and a network status of various historic scenarios.

In one embodiment, there is a machine learning module 1248 operative to learn from the historical data 115 to develop a synthetic scenario therefrom. There may be a synthetic demand module 1250 operative to characterize a synthetic demand status based on the raw demand data and user input parameters. Similarly, there may be a synthetic network module 1252 that is operative to characterize a synthetic network status based on the raw network status information, the synthetic demand status, and user input parameters.

In one embodiment, there is a module 1254 operative to calculate the number of simulations N to perform, such that at that the simulations are limited to a total predetermined time and/or a predetermined accuracy.

In one embodiment, there is an Orthogonal Latin Hypercube Sampling (OLHS) module 1256 operative to sample the data of the synthetic scenario for a subject node to provide a sample space that is divided into equally probable subspaces, such that the sample points are each a Latin Hypercube Sample and each subspace is sampled with the same density.

In one embodiment, there is a synthetic labor efficiency module 1258 operative to calculate a synthetic efficiency of labor based on the synthetic demand and the synthetic network data. Further, there may be a synthetic labor resources module 1260 operative to calculate the labor resources for one or more nodes based on a synthetic allocation of inventory and the synthetic labor efficiency.

In one example a program, such as Apache™, can be stored for operating the system as a Web server. In one embodiment, the HDD 1208 can store an executing application that includes one or more library software modules, such as those for the Java™ Runtime Environment program for realizing a JVM (Java™ virtual machine).

As discussed above, functions relating to determining settings of node parameters for multi-objective optimization may include a cloud. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
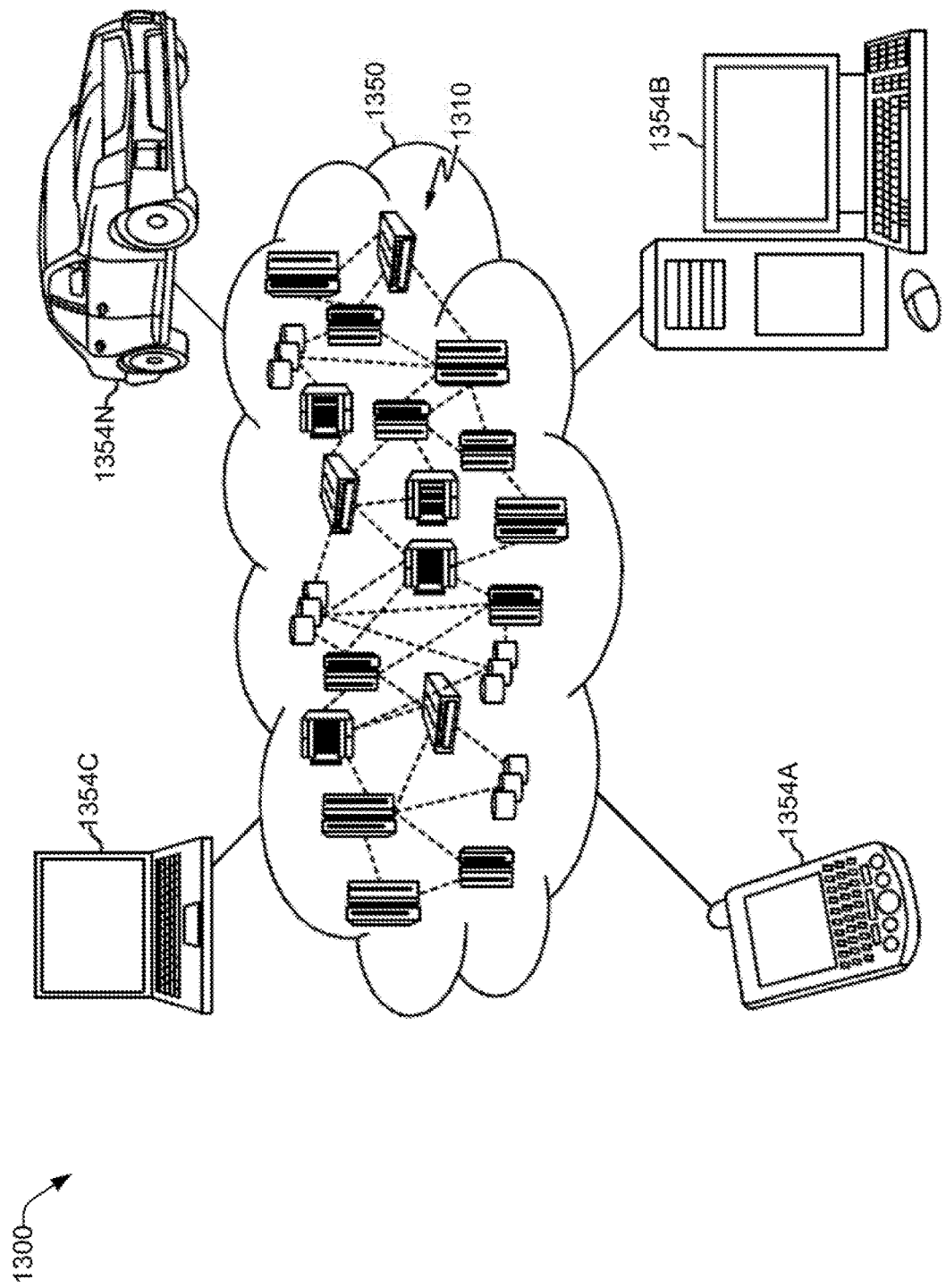
FIG. 13 depicts a cloud computing environment according to an illustrative embodiment.

Referring now to FIG. 13, an illustrative cloud computing environment 1300 is depicted. As shown, cloud computing environment 1300 includes one or more cloud computing nodes 1310 with which local computing devices used by cloud consumers, such as, for example, personal digital assistant (PDA) or cellular telephone 1354A, desktop computer 1354B, laptop computer 1354C, and/or automobile computer system 1354N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 1310 and cloud computing environment 1350 can communicate with any type of computerized device over any type of network and/or network addressable connection (e.g., using a web browser).

Figure 14:
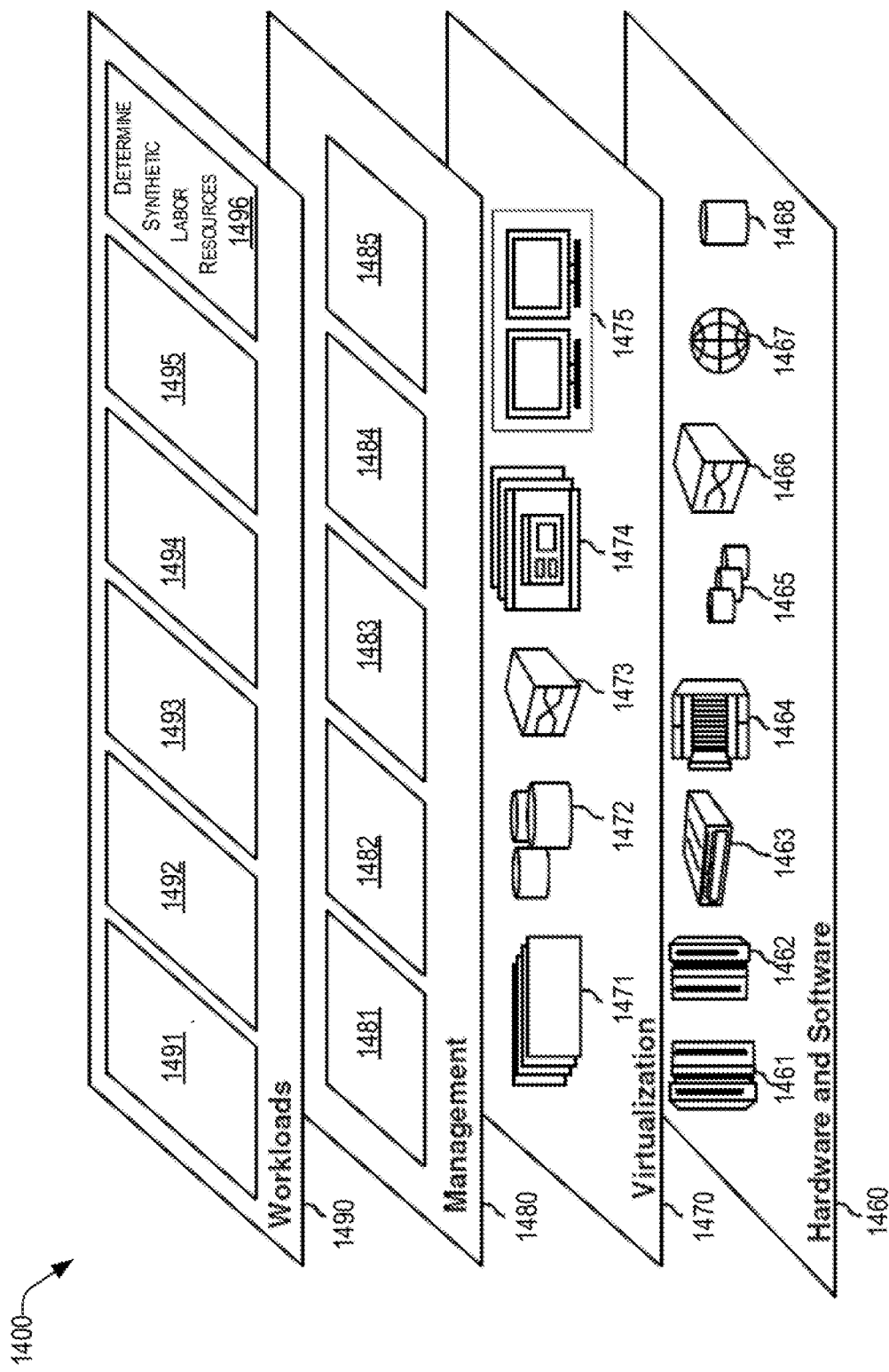
FIG. 14 depicts functional abstraction model layers provided by a cloud computing environment according to an illustrative embodiment.

Referring now to FIG. 14, a set of functional abstraction layers provided by cloud computing environment 1350 (FIG. 13) is shown. It should be understood in advance that the components, layers, and functions shown in FIG. 14 are intended to be illustrative only and embodiments of the disclosure are not limited thereto. As depicted, the following layers and corresponding functions are provided:

Hardware and software layer 1460 includes hardware and software components. Examples of hardware components include: mainframes 1461; RISC (Reduced Instruction Set Computer) architecture based servers 1462; servers 1463; blade servers 1464; storage devices 1465; and networks and networking components 1466. In some embodiments, software components include network application server software 1467 and database software 1468.

Virtualization layer 1470 provides an abstraction layer from which the following examples of virtual entities may be provided: virtual servers 1471; virtual storage 1472; virtual networks 1473, including virtual private networks; virtual applications and operating systems 1474; and virtual clients 1475.

In one example, management layer 1480 may provide the functions described below. Resource provisioning 1481 provides dynamic procurement of computing resources and other resources that are utilized to perform tasks within the cloud computing environment. Metering and Pricing 1482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1483 provides access to the cloud computing environment for consumers and system administrators. Service level management 1484 provides cloud computing resource allocation and management such that required service levels are met. Service Level Agreement (SLA) planning and fulfillment 1485 provide pre-arrangement for, and procurement of, cloud computing resources for which a future requirement is anticipated in accordance with an SLA.

Workloads layer 1490 provides examples of functionality for which the cloud computing environment may be utilized. Examples of workloads and functions which may be provided from this layer include: mapping and navigation 1491; software development and lifecycle management 1492; virtual classroom education delivery 1493; data analytics processing 1494; transaction processing 1495; and determining the labor resources for nodes in an omnichannel distribution system 1496.

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a storage device for content and programming coupled to the processor;
   a program stored in the storage device, wherein an execution of the program by the processor configures the computing device to perform acts comprising:

receiving input parameters;
receiving historical data related to a network of nodes, from a data repository;
determining a synthetic scenario representing a hypothetical situation, based on the received input parameters and the historical data;
for each node:
  identifying key parameters;
  setting the key parameters based on a multi-objective optimization including determining a range of each key parameter based on the synthetic scenario, comprising:
    determining a maximum and a minimum setting for the key parameter from a synthetic network status data;
    extending at least one of the maximum and the minimum setting by a predetermined sigma variation; and
    basing the range of the key parameter between the maximum and the minimum, including the extension by the predetermined sigma variation, wherein the multi-objective optimization includes a synthetic inventory allocation to the node based on the synthetic scenario;
  reducing a computational load on the processor by determining a number of simulations N to perform with data sampled from the synthetic scenario based on the range of each of the key parameters, wherein the determination of the number of simulations N to perform comprises:
    determining an availability of computational resources of the computing device;
    determining a desired computing accuracy; and
    setting the number of simulations N to perform based on the determined availability of computational resources in view of the desired computing accuracy;
  determining a synthetic labor efficiency for the node from the synthetic scenario; and
  performing the N simulations to calculate labor resources based on the synthetic inventory allocation for the synthetic scenario; and
displaying the labor resources of at least one node of the network of nodes on a user interface of a user device.

2. The computing device of claim 1, wherein setting the key parameters based on the multi-objective optimization comprises, for each node:
  for each of the N simulations, performing a multi-objective optimization to determine a cost factor of the parameter settings and storing the cost factor in the storage device; and
  selecting the parameter settings with a lowest cost factor.

3. The computing device of claim 2, wherein the data sampled from the synthetic scenario within the determined range of each key parameter is obtained by applying Orthogonal Latin Hypercube Sampling (OLHS) on the synthetic scenario based on the key parameters.

4. The computing device of claim 2, wherein determining the synthetic scenario comprises:
  creating a synthetic demand status data based on the historical data and the input parameters; and
  creating the synthetic network status data based on the historical data, the input parameters, and the synthetic demand status.

5. The computing device of claim 4, wherein determining the range of a key parameter comprises:

determining a maximum and a minimum setting for the key parameter from the synthetic network status data; and
basing the range of the key parameter between the determined maximum and the minimum setting.

6. The computing device of claim 2, wherein the cost factor is based on at least one of: (i) a fulfilment cost for a predetermined time period, and (ii) a capacity utilization of the omnichannel distribution system for the predetermined time period.

7. The computing device of claim 2, wherein:
the historical data includes:
  raw demand data of one or more products offered by the network of nodes;
  raw node data of each node in the network of nodes; and
  raw labor efficiency data of each node in the network of nodes;
the synthetic demand status is based on the raw demand data;
the synthetic network status is based on the raw node data.

8. The computing device of claim 1, wherein the determination of the number of simulations N to perform is based on: (i) a time limit for the N simulations, and (ii) the determined accuracy for the simulations.

9. The computing device of claim 1, wherein the key parameters are identified from the input parameters of the user.

10. The computing device of claim 1, wherein the key parameters are identified by receiving the key parameters from a business rules database over the network.

11. The computing device of claim 1, wherein determining the synthetic scenario comprises using machine learning to learn from the historical data.

12. A non-transitory computer readable storage medium tangibly embodying a computer readable program code having computer readable instructions that, when executed, causes a computer device to carry out a method of calculating labor resources for a network of nodes in an omnichannel distribution system, the method comprising:
  receiving input parameters from a computing device of a user;
  receiving historical data related to a network of nodes, from a data repository;
  determining a synthetic scenario representing a hypothetical situation, based on the received input parameters and the historical data;
  for each node:
    identifying key parameters;
    setting the key parameters based on a multi-objective optimization including determining a range of each key parameter based on the synthetic scenario, comprising:
      determining a maximum and a minimum setting for the key parameter from a synthetic network status data;
      extending at least one of the maximum and the minimum setting by a predetermined sigma variation; and
      basing the range of the key parameter between the maximum and the minimum, including the extension by the predetermined sigma variation, wherein the multi-objective optimization includes a synthetic inventory allocation to the node based on the synthetic scenario;
    reducing a computational load of the computer device by determining a number of simulations N to perform with data sampled from the synthetic scenario within the determined range of each of the key parameters, wherein the determination of the number of simulations N to perform is based on a determination of availability of computational resources and a desired accuracy;

determining a synthetic labor efficiency for the node from the synthetic scenario; and performing the N simulations to calculate labor resources based on the synthetic inventory allocation for the synthetic scenario; and displaying the labor resources of at least one node of the network of nodes on a user interface of a user device.

13. The non-transitory computer readable storage medium of claim 12, wherein setting the key parameters based on the multi-objective optimization comprises, for each node:

for each of the N simulations, performing a multi-objective optimization to determine a cost factor of the parameter settings and storing the cost factor in a storage device; and selecting the parameter settings with a lowest cost factor.

14. The non-transitory computer readable storage medium of claim 13, wherein the data sampled from the synthetic scenario within the determined range of each key parameter is obtained by applying Orthogonal Latin Hypercube Sampling (OLHS) on the synthetic scenario based on the key parameters.

15. The non-transitory computer readable storage medium of claim 13, wherein the cost factor is based on at least one of: (i) a fulfilment cost for a predetermined time period, and (ii) a capacity utilization of the omnichannel distribution system for the predetermined time period.

16. The non-transitory computer readable storage medium of claim 12, wherein determining the synthetic scenario comprises:

creating a synthetic demand status data based on the historical data and the input parameters; and creating the synthetic network status data based on the historical data, the input parameters, and the synthetic demand status.

17. The non-transitory computer readable storage medium of claim 16, wherein:

the historical data includes:

raw demand data of one or more products offered by the network of nodes;

raw node data of each node in the network of nodes; and raw labor efficiency data of each node in the network of nodes;

the synthetic demand status is based on the raw demand data; and the synthetic network status is based on the raw node data.

18. The non-transitory computer readable storage medium of claim 12, wherein determining the synthetic scenario comprises using machine learning to learn from the historical data.

* * * * *